US008301480B2

(12) United States Patent
Ramachandran

(10) Patent No.: US 8,301,480 B2
(45) Date of Patent: Oct. 30, 2012

(54) AUTOMATICALLY EVOLVING PROCESSES IN WORKFLOW AUTOMATION

(75) Inventor: Puthukode G. Ramachandran, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1235 days.

(21) Appl. No.: 11/933,508

(22) Filed: Nov. 1, 2007

(65) Prior Publication Data

US 2009/0144120 A1 Jun. 4, 2009

(51) Int. Cl.
*G06Q 10/00* (2006.01)
(52) U.S. Cl. .............. 705/7.27; 705/7.26; 705/7.21; 705/7.23
(58) Field of Classification Search ......... 705/7.15–7.35
See application file for complete search history.

(56) References Cited

U.S. PATENT DOCUMENTS

| | | | |
|---|---|---|---|
| 2006/0026054 A1* | 2/2006 | Barel et al. ........... | 705/10 |
| 2006/0109500 A1* | 5/2006 | Morita et al. ......... | 358/1.15 |
| 2007/0038499 A1* | 2/2007 | Margulies et al. ..... | 705/9 |
| 2008/0235079 A1* | 9/2008 | Barel et al. ........... | 705/10 |
| 2008/0262890 A1* | 10/2008 | Korupolu et al. ..... | 705/8 |
| 2008/0312963 A1* | 12/2008 | Reiner ................. | 705/2 |

OTHER PUBLICATIONS

Wang, Alf Inge, "Using a Mobile, Agent-based Environment to support Cooperative Software Processes", Norwegian University for Science and Technology, Dept. of Computer and Information Science., Feb. 5, 2001.

Botelho, Bridget, "CMDB software evades data center managers," downloaded on Sep. 17, 2007 from http://searchdatacenter.techtarget.com/originalContent/0,289142,sid80_gci1264317,00.html.

IBM, "IBM Tivoli Change and Configuration Management Database—Product Overview," downloaded Sep. 17, 2007 from http://www-306.ibm.com/software/tivoli/products/ccmdb/.

IBM, "IBM Tivoli Change and Configuration Management Database—Data Sheet," downloaded on Sep. 17, 2007 from ftp://ftp.software.ibm.com/software/tivoli/datasheets/ds-comdp.pdf.

Wikipedia, "\\\orkflow," downloaded on Sep. 17, 2007 from http://en.wikipedia.org/wiki/workflow.

* cited by examiner

*Primary Examiner* — Beth V Boswell
*Assistant Examiner* — Adrian McPhillip
(74) *Attorney, Agent, or Firm* — Robert H. Frantz; Jeffrey S. LaBaw

(57) ABSTRACT

A system, a method, computer-readable medium for conveying software, or business methods for gradually automating a workflow in a configuration change management system by providing a first workflow template having a relatively low level of automation and complexity in which at least a plurality of tasks require manual input, manual response, or manual approval, operating the first workflow by a workflow automation system engine, monitoring a measurement of the maturity level of the process during the operation the first workflow, and responsive to detecting the maturity level meeting pre-determined benchmark, automatically selecting, engaging, and operating a second workflow template which increases automation by automating one or more subprocesses, adding one or more subprocesses, or eliminating one or more subprocesses.

13 Claims, 15 Drawing Sheets

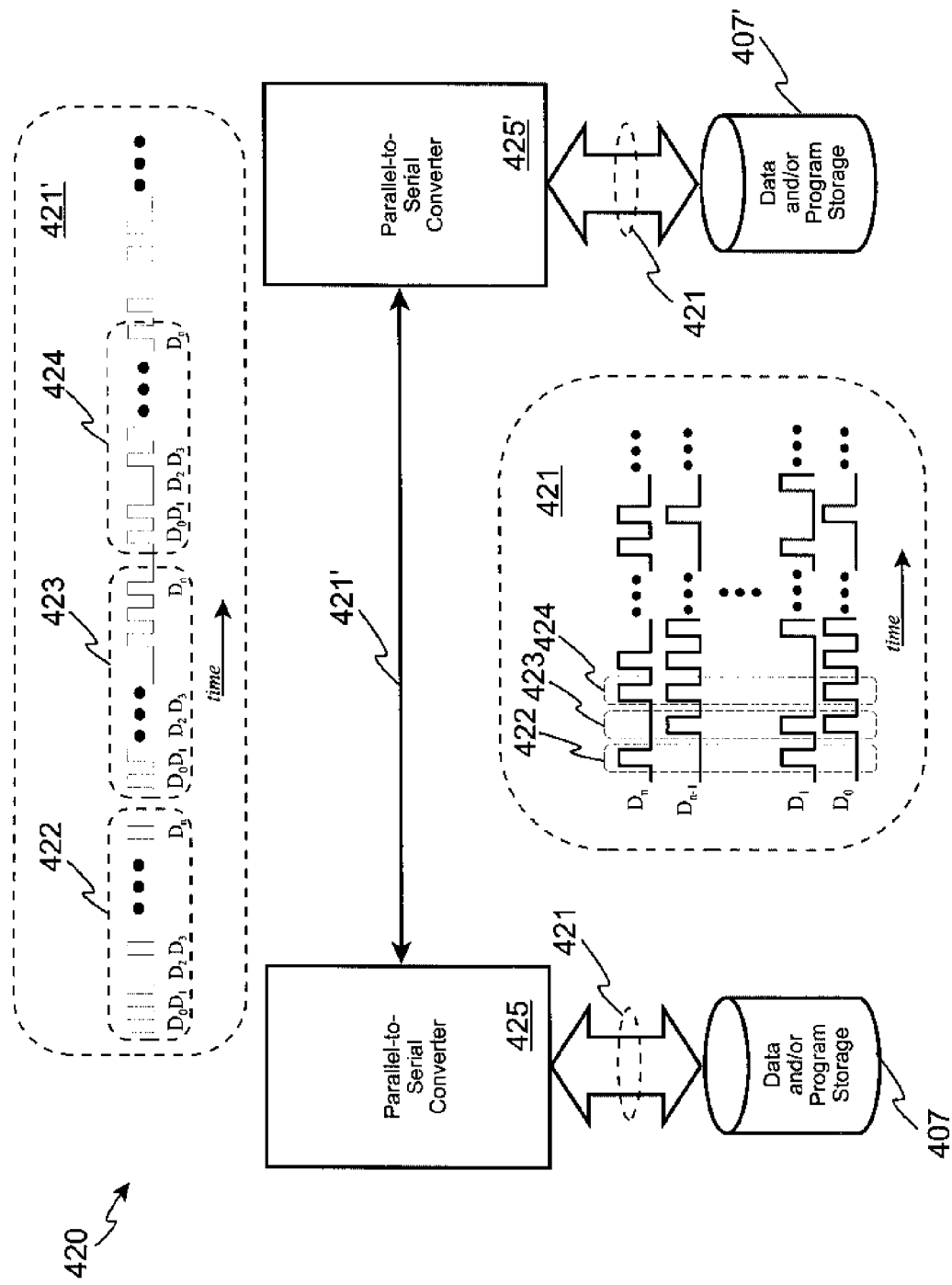

AUTOMATICALLY EVOLVING PROCESSES IN WORKFLOW AUTOMATION

CROSS-REFERENCE TO RELATED APPLICATIONS

Claiming Benefit Under 35 U.S.C. 120

None.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The following document is incorporated by reference in its entirety: "IBM Tivoli Change and Configuration Management Database" specification sheet, copyright 2006, document number GC28-8445-00, published by IBM Corporation Software Group, Route 100, Somers, N.Y. 10589, U.S.A.

BACKGROUND OF THE INVENTION

1. Field of the Invention

The present invention relates generally to automated workflow systems and methods for increasing or decreasing levels of automation in workflow management systems.

2. Background of the Invention

The following description of the Background of the Invention is provided as general background information other than prior art. Nothing in the following paragraphs should be construed as "admitted prior art" unless it is specifically noted as "prior art".

Workflow automation is a general term used to describe advanced computing systems which automate any reliably repeatable pattern of activity by defining roles of each human involved in the work process, organizing resources and information flow, and provisioning one or more computer systems to conduct and automate the work flow process. For example, some workflow processes such as fulfilling customer requests and complaints may involve several steps or stages to be handled by different personnel, such as:

(a) initial classification of the incoming customer communication (email, letter, telephone call, etc.) as a request for help or a complaint;

(b) routing of the communication to a complaint department or a help department;

(c) when received within a department, further reviewing of the communication details and routing of the communication to an appropriately trained and skilled employee (e.g. customer relations agent, technician, etc.);

(d) drafting of a response by the employee;

(e) forwarding of the draft response to an approval authority (e.g. manager, supervisor, etc.);

(f) review of the draft response by the approval authority; and (g) upon approval, forwarding the response to the customer; or upon disapproval, returning the communication to the employee for further work or even escalating the communication to another level of review, another department, etc.

Many of these steps are automated through communications systems such as electronic-mail based systems, voice-response units, and the like. Many of these tasks and steps remain best handled by a human. Some tasks, however, can be partially automated, such as using natural language processing to review and screen incoming email messages to determine if it is likely a complaint or likely a request for help.

Many areas of business operations have benefited by workflow automation, from Customer Relations Management ("CRM") to order fulfillment. Many business processes which are primarily internal processes, such as product change control management, have also benefited from workflow automation because it allows global personal to collaborate on tasks while maintaining repeatable processes. When processes are repeatable, then they can be managed, monitored for quality, and further enhanced, such as insertion of automation in stages and phases where technology can be leveraged in place of human labor or effort.

As stated in "IBM Tivoli Change and Configuration Management Database" specification sheet, copyright 2006 by IBM Corporation, document number GC28-8445-00, which is incorporated by reference herein, efficient and effective information technology (IT) management requires an IT service management platform. As technology becomes more closely intertwined with day-to-day business functions, technology-centric IT management practices are slowly evolving to a more business-focused management of IT services. The IBM IT Service Management strategy enables alignment of business insight and innovative technology by finding ways to optimize the intersection of four key areas: (1) people spread across organizational and technology silos, who need to collaborate effectively; (2) processes, which can be automated using IBM Tivoli process managers based on proven best practices; (3) information throughout the enterprise that is frequently underutilized but can be made actionable when integrated; and (4) technology from IBM and other vendors that is used for executing, automating and monitoring process tasks.

This publication continues to state that, at the core of the IBM IT Service Management strategy, IBM Tivoli® Change and Configuration Management Database (CCMDB) provides an enterprise-ready configuration management database and platform upon which you can standardize and share information that helps you integrate people, processes, information and technology. Tivoli CCMDB helps you automatically discover and federate IT information spread across the enterprise, including details about servers, storage devices, networks, middleware, applications and data.

One of the challenges of managing your IT infrastructure like a business is the common inability to effectively administer processes for both change and configuration within an IT environment. Tivoli CCMDB addresses this inability with automated, preconfigured and customizable process workflows

SUMMARY OF THE INVENTION

The invention comprises a system, a method, a computer-readable medium for conveying software, or one or more business methods for gradually automating a workflow in a workflow automation system, and especially in a configuration change management system, by providing a first workflow template having a relatively low level of automation and complexity in which at least a plurality of tasks require manual input, manual response, or manual approval, operating the first workflow by a change configuration management system engine, monitoring a maturity level measurement during the operation the first workflow, and responsive to detecting the maturity level meeting a pre-determined benchmark, automatically selecting, engaging, and operating a second workflow template which increases automation by automating one or more subprocesses, adding one or more subprocesses, or eliminating one or more subprocesses.

BRIEF DESCRIPTION OF THE DRAWINGS

The following detailed description when taken in conjunction with the figures presented herein provide a complete disclosure of the invention.

FIGS. 4a, 4b and 4c, illustrate computer readable media of various removable and fixed types, signal transceivers, and parallel-to-serial-to-parallel signal circuits.

DETAILED DESCRIPTION OF THE INVENTION

Figure 1:
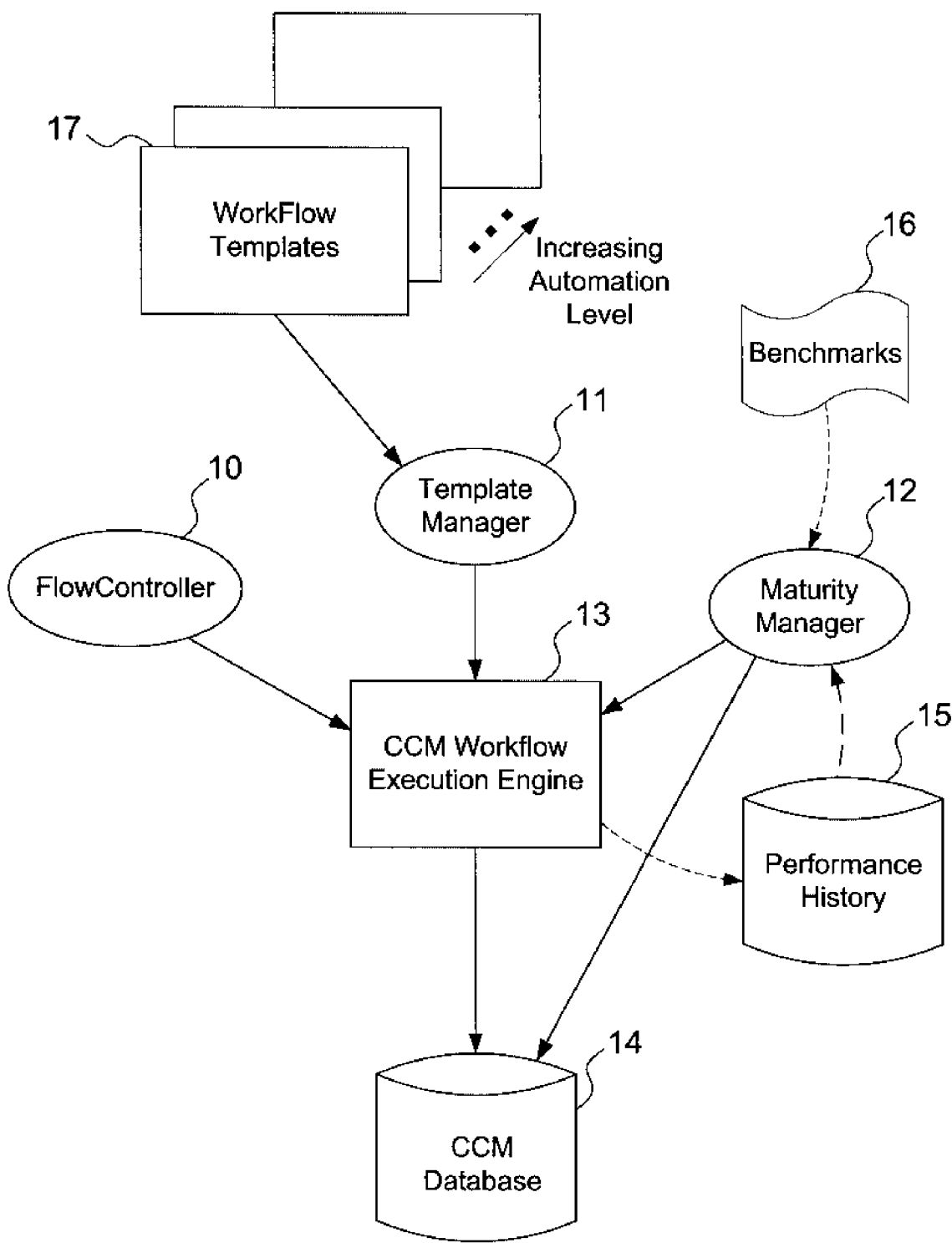
FIG. 1 illustrates an arrangement of components and systems according to the invention.

Recognition by the Inventor of an Unaddressed Problem in the Art

The inventors of the present invention have recognized and solved problems previously unrecognized by others in the art of providing significant increases in the automation level of a workflow automation system. For example, one type of workflow automation system is an automated Change Control Management server used to distribute software products, patches, and upgrades. Semi-automated workflow change control management tools in software development, maintenance, distribution, and support environments include coordinate efforts by human administrators as well as automated and semi-automated tools and resources. To distribute a patch to one or more end users, several personnel's actions must be coordinated in order to determine the appropriate patch for each target system, assess the impact of distributing and installing the patch, and to obtain several levels of approval to execute the patch distribution and installation.

Several organizations and people get confused and are threatened if a new process like Change Management and Release Management are introduced and automated at one stretch. For example there could be usability issues and employees who used to perform certain actions in a certain manner may resist change. However if change happens slowly and automation is staged then people are more comfortable.

The inventors recognized this challenge and potential solution, which have not yet been fully reported or addressed by others in the art. The inventors have recognized that this problem exists not only with IBM Tivoli™ Change Control Management systems, but also with other Change Control Management systems such as HP's uCMDB™, Computer Associate's CMDB™, BMC Software Incorporated's Atrium™ and Managed Objects' CMDB360™.

Further, as CCMDB is a type of workflow automation, the present invention may be more generally beneficial to, and implemented cooperative with any workflow automation system.

As such, although the following descriptive examples of embodiments of the invention will be set forth in terms of implementation with a specific Change Control Management database system, it will be readily recognized by those skilled in the art that the invention may be equally well implemented with other CCM systems, and indeed with other workflow automation systems in general.

Overview of the Invention

The present invention allows the configuration of process templates manually in the initial stages. Once the organization and people can execute simple processes, the complexity is increased by the backend engine which monitors the process execution.

In invention monitors the effectiveness with which each process is completed, and when pre-defined benchmarks are reached such as time to complete a process and accuracy of completion of a process, new levels of automation are engaged which increase the complexity and automation level of the processes. Through this gradual increasing of automated processes and decreasing of manual processes, change control is implemented in a fashion which allows for smooth and non-disturbing adoption by human administrators.

Preferably, a template-based workflow automation is utilized in part to realize the invention, such as IBM Tivoli's (Configuration Change Control Database ("CCMDB") system, which allows the configuration of "process templates" manually in the initial stages. Once the organization and people carry execute simple processes, the complexity is increased by the backend engine which monitors the process execution.

There are three main components to the workflow engine that allows the evolution of processes, as illustrated in FIG. 1:

(1) "workflow templates" (17) or "process templates" that are defined and loaded to the "CCMDB engine" (13, 14) by a "template manager" (11);

(2) a "FlowController" (10) which allows and enables the execution of these templates; and (3) a "Maturity/Evolution Manager" (12) that manages how organizations can evolve their processes from manual to automated status.

The CCMDB-based system allows the configuration of process templates manually in the initial stages, for a low level of complexity and low-level of stress or anxiety to the human administrators. Once it is detected that the organization and people are executing simple processes in manners which meet pre-defined benchmarks, the complexity and automation level is increased by the backend engine which monitors the process execution.

The Maturity Manger can be set to various levels like aggressive, slow, etc. The templates for execution are chosen based on how many processes the organization has executed successfully and how many error free operation happened etc. Based on all the inputs, the Maturity Manager selects a complex template or a simple process template.

Workflow Automation Engine

While the following paragraphs will describe in detail how to make and use such an embodiment relative to the IBM Tivoli CCMDB platform, it will be readily recognized by those skilled in the art that the invention may be alternatively realized in conjunction with other CCMDB products, such as HP's uCMDB™, Computer Associate's CMDB™, BMC Software Incorporated's Atrium™ and Managed Objects'CMDB360™.

Whereas the present invention is optionally implemented as an extension or enhancement to a Configuration Change Management ("CCM") tool, such as IBM Tivoli's™ Configuration Change Management Database Product ("CC-MDB"), the following disclosure will refer to the CCMDB "engine" in place of a more generalized term "workflow automation engine". In alternative embodiments utilizing other systems, such as customer relationship management ("CRM"), Websphere™ Process server with Business Process Execution Language ("BPEL") or other workflow automation systems, the automation engine would perform the analogous function to the invention as the CCM engine in the following examples.

Figure 5:
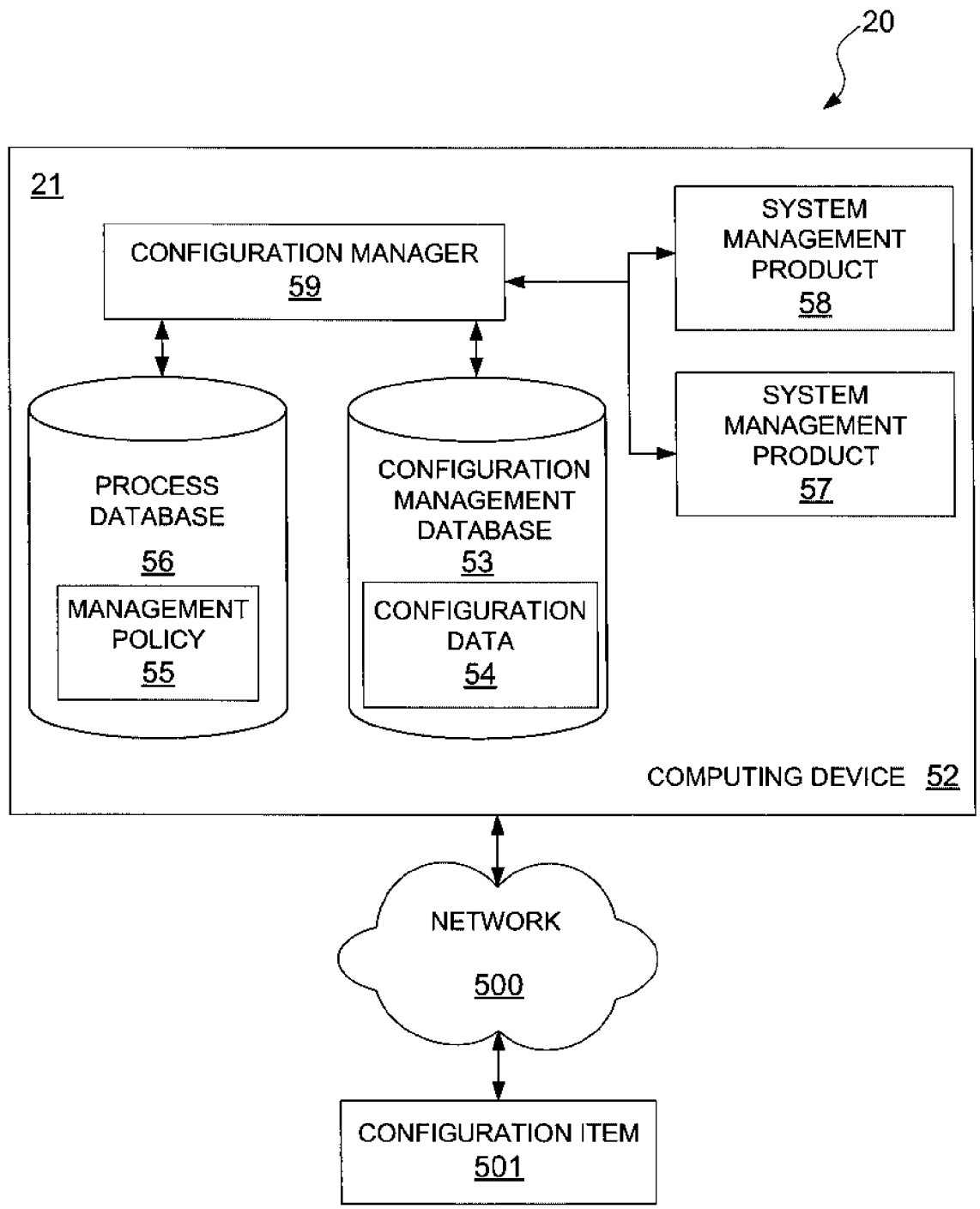
FIG. 5 provides general information about components of a Configuration Change Management Database system and related system management tools.

For example, IBM Tivoli's CCMDB™ has a general organization (50) as shown in FIG. 5. The CCMDB system (51) comprises a number of software modules executed by a computing device (52), such as a web server. The Configuration Manager component (57) accesses a process database (56) to retrieve configuration management policies (55), and accesses a configuration database (53) to retrieve or store configuration data (54) about a configuration item (501). Other system management products (58, 59) may integrate to the CCMDB, as well. The system is designed to remotely support configuration items (501) via networks (500), such as the Internet or an intranet. For further reference, the reader is directed towards the "IBM Tivoli Change and Configuration Management Database" specification sheet, copyright 2006 by IBM Corporation, document number GC28-8445-00, which is incorporated by reference herein.

A "workflow template" defines which tasks are performed, in what order they are to be performed, who or what is to perform each task, and any criteria required to initiate, sustain, or complete each task, including conditional criteria such as receipt of authorization from an administrator. Workflow templates, themselves, are well known in the art of data center management.

Other CCMDB products and other types of workflow automation systems share similar functionality, although their specific architectures may be different. It is within the skill of those in the art to implement the invention to these other system architectures to achieve the benefits and functions of the present invention.

Logical Processes of the Invention

The following logical processes of the present invention may be alternatively realized in software executed by a computer, such as a server or a client computer, by circuitry, such as an application specific integrated circuit ("ASIC") or programmable gate arrays, or in a combination of software, computers, and circuits.

The database of CCMDB contains needed information about "configuration items" ("CIs"), which are hardware components of computer systems which are configurable, such as a keyboard, a mouse, an installed card (e.g. LAN interface card, graphics card), as well as software components of computer systems, such as the operating system, drivers, application programs, etc.

The database not only contains information about each CI, but also about the relationships between the CIs, and between CIs and the systems in which they are installed.

A CCMDB tool or system is highly useful for managing system configurations and related administrative processes before the CIs are distributed to the end systems where they will be installed. For example, certain administrative approvals may be required prior to distributing software applications or hardware update to multiple computes. Or, an impact assessment may be required for a planned action such as removing a keyboard or disconnecting a network cable from a server. Impact assessment is required especially if change is performed on critical components. So, a CCMDB tool is essential for proper planning of configuration changes in a computing enterprise.

However, according to the problem discovered by the inventor, implementing complex, automated procedures into a workflow such as configuration is change can be disruptive to the human administrators when performed in one step. The large change in process can cause an error rate in the human tasks to increase due to the users not being familiar with new forms, new screens, newly requested information or choices, etc., until the users become familiar with the new steps. In some instances, the change can also cause resentment, dissatisfaction, or even rebellion against the higher-level of automation. As such, in the following paragraphs, the term "maturity level" shall be used to describe a range of measurable attributes of the workflow automation system, including but not limited to measuring user error rates, measuring time for acclimation to recent changes, and measuring user satisfaction or acceptance rate through surveys.

Process Upgrading Comprehending User Error Rates

Figure 9:
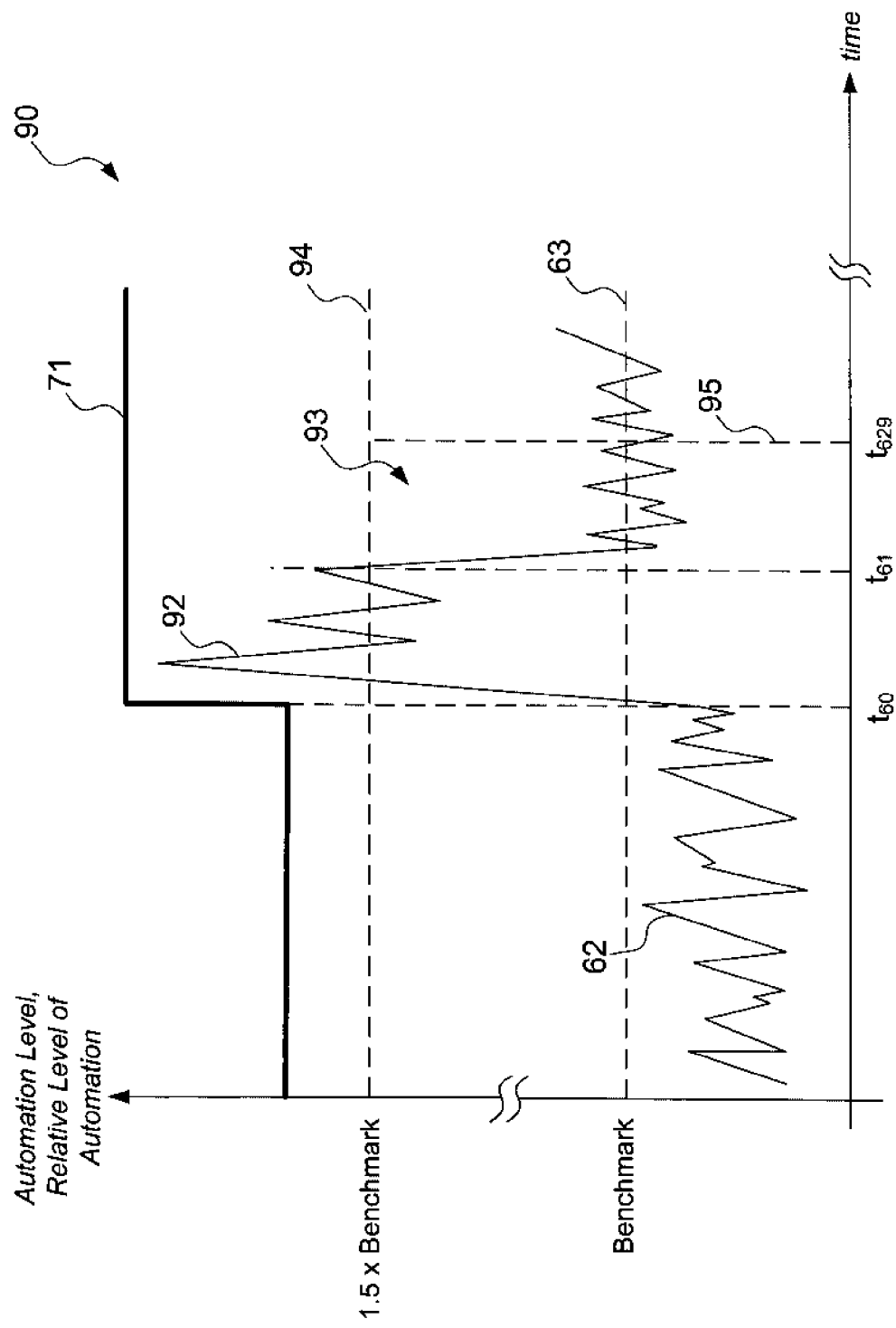
FIG. 9 provides a graphical illustration of time periods and error thresholds according to advanced embodiments of the invention.

In a first aspect of the present invention, maturity level of the most recent workflow process automation is measured by monitoring user error rates. Turning to FIG. 9, such a disruption is shown in graphical form (90) of automation level and error incident counts (both on the y-axis) versus time. In this simplified illustration, a rate of errors or incidents (62) is plotted over time, correlated to two levels of automation—a first, lower level prior to a workflow automation change at to, and a second, higher level of automation after $t_0$. The error count (62) is shown as falling below a benchmark level (33) prior to the change at $t_0$, and it exceeds the benchmark level after the change at $t_0$.

Figure 8:
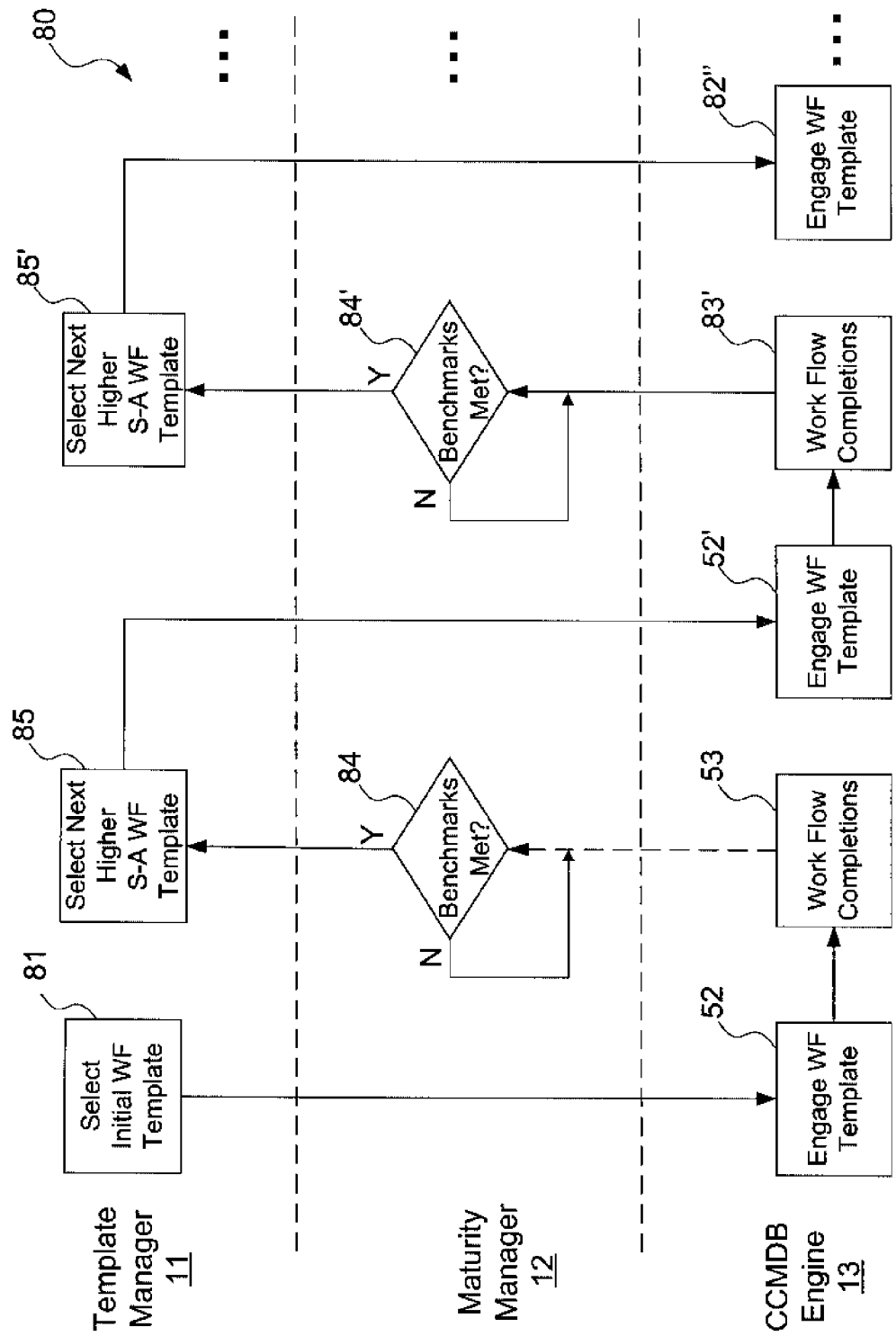
FIG. 8 sets for the logical processes and interactions between components of the invention.

Turning to FIG. 8, the Template Manager (11) initially selects (81) a lower-automation level workflow template, which is engaged (82) by the CCMDB engine (13). The Maturity Manager (12) component of the invention monitors how proficiently the human administrators of data centers are performing (83) the CCM tasks at current levels of complexity and automation of the workflow. Tasks such as completion of forms, response to queries, assessing change impact, obtaining authorization to distribute a CI or a change to a CI, etc., are monitored to detect when certain predefined proficiency benchmarks are reached by the administrators.

When such a proficiency level is detected as being at or below the benchmark(s) (84), the Maturity Manager then triggers the Template Manager (11) to select the next higher-level automated workflow template (85), which is then engaged (82') by the CCMDB engine (13).

As with the previous level of automation, the Maturity Manager monitors (84') the error and incident rates reported by the system management tools during execution (83') of the workflows by the administrators. And, when the benchmarks are met, the Template Manager (11) selects (85') the next higher level automation workflow template, which is then engaged by the CCMDB engine (13).

The monitoring and template upgrading process is iterated until a final level of complexity and automation is reached, thereby allowing the human administrators to gradually adjust to the complexity, learn and leverage the automation, and avoid any shock or disturbance to the human administrators' performance level.

Figure 6:
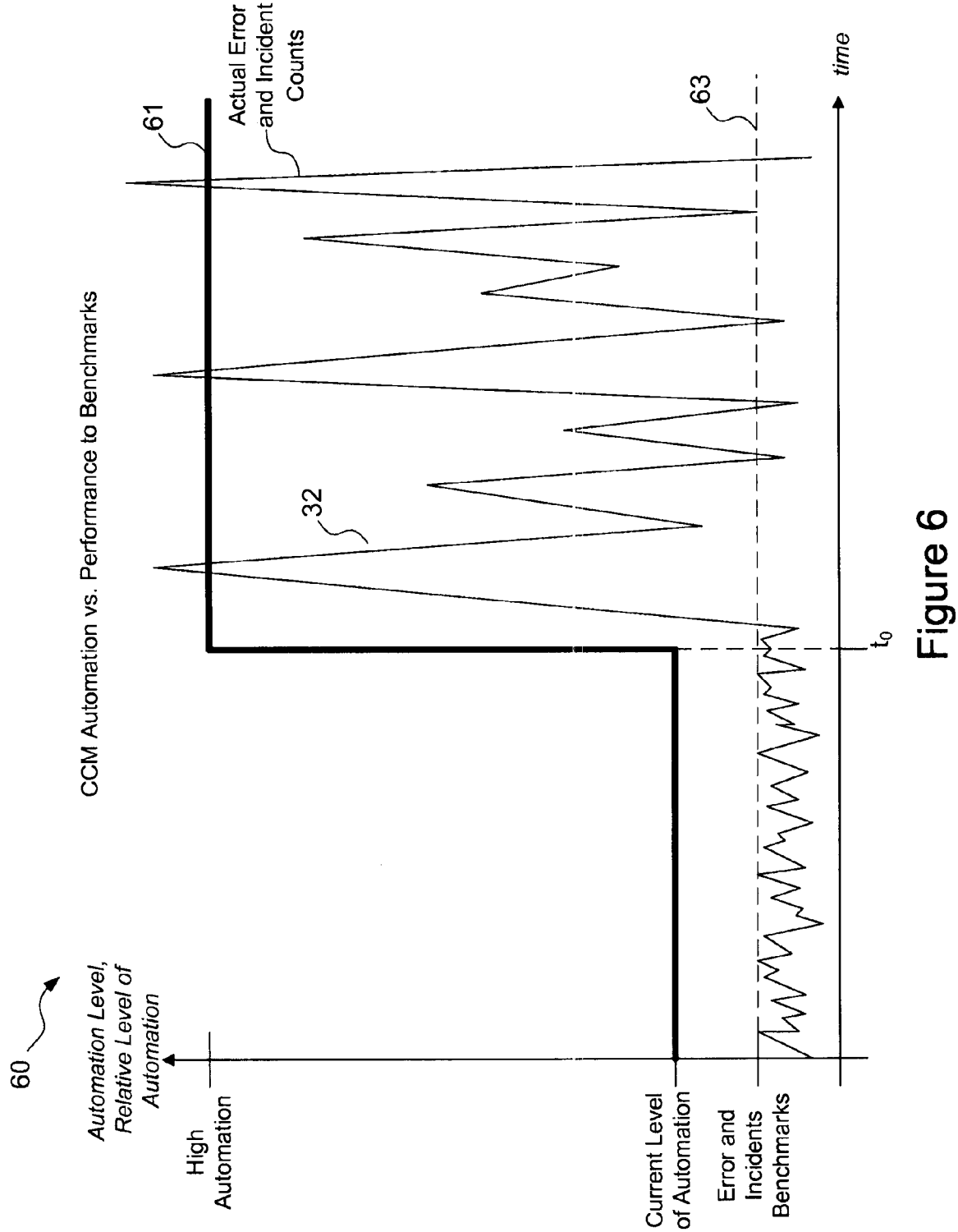
FIG. 6 illustrates error rates relative to significant changes in complexity and automation level in configuration management.
Figure 7:
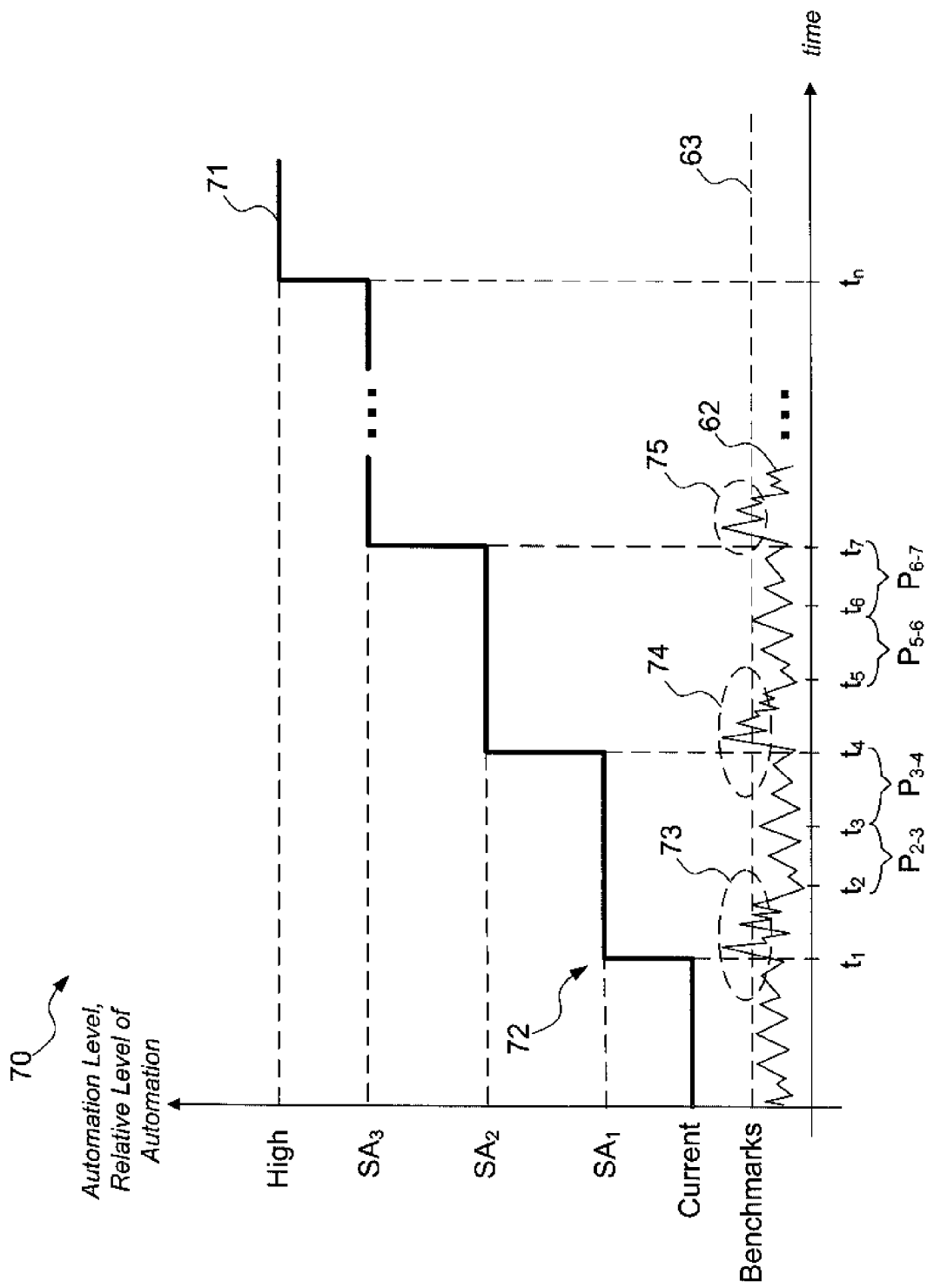
FIG. 7 illustrates error rates relative to stepwise, incremental changes in complexity and automation level in configuration management.

This phased manner of automatically implementing a highly automated CCMDB system is much less likely to cause major disruptions in the operation of the data center or critical business systems. For example, FIG. 7 shows a similar graphical illustration (70) of error counts as that shown (60) in FIG. 6, but instead of a single, large change (61), multiple incremental steps of increasing levels of automation (71, 72) are shown at $t_1$, $t_4$, and $t_7$. Since each of these changes are less drastic in complexity, the administrators only require a short period of adjustment (43, 44,45), during which error rates may exceed the benchmark. In typical practice, the magnitude of the error rate over the benchmark during the period adjustment is much less than that of the single, monumental change as shown in FIG. 6. Following these periods of adjustment (73, 74, 75) are periods of proficiency starting at t2, and t5, for example, during which the error rates fall blow the error benchmark (63).

Process Upgrading Comprehending Historical Success

According to another aspect of the invention, the Maturity Manager uses historical performance as a measure of process maturity level, optionally in conjunction with current performance information, to determine if a more complex or higher level of automation is suitable for engaging. For example, in a previous configuration change that required a network cable removal, perhaps all of the workflow steps were completed such as assessing the impact of removal of the cable, obtaining necessary authorization to implement the cable removal, and executing the removal of the cable. However, if an incident occurred as a result of the cable removal, such as an unforeseen process was using the network connection and was caused to err as a result of the removal of the cable, this incident is recorded in the CCM database. So, upon handling of a similar CI configuration change, the Maturity Manager accesses the CCM database, finds the similar incident, and can delay engaging a higher level of automation until the number of related incidents are historically lower than a pre-defined acceptable level. For example, when such incidents have been lower below the relevant benchmark, such as 100 completions of the workflow with 99.9% error-free execution, the higher level of automation engaged may allow fully automated implementation of the change, such as fully automatically removing a software component.

Process Upgrading Comprehending Human User Comfort Level or Success

According to another aspect of the invention, user comfort, success, or satisfaction levels are used as a measurement of maturity level. The users can be surveyed, through online questionnaires or through optional "suggestions for improvement" queries. The results of the surveys can be used alone as a maturity level, or can be combined with the other maturity level measurements, such as error rate, to determine when and if a next-level of higher automation template should be engaged. For example, in a customer relationship management system, after engaging a greater level of automation, a system may automatically propose a solution to a technical question based on a library of "frequently asked questions" and answers. However, the user then may be relegated to reviewing the proposed reply instead of using his or her own technical expertise to draft a new, custom reply. This may cause some dissatisfaction among the users, and may have technical inaccuracies in the pre-determined answers. So, providing the users an opportunity to indicate dissatisfaction with the change in process and/or believed errors in the upgraded process via surveys can provide responses which are collected, collated and analyzed to determine whether a certain maturity level has been reached or not.

Accelerated Workflow Progress

In a further enhancement of the invention, an accelerated pace of workflow progress can be implemented if the Maturity Manager determines that the maturity level might have been reached quickly, such as performance against benchmarks disturbance being less than an expected impact threshold. In such a circumstance where the most recent increase in workflow complexity was minimally disruptive and well received, then the Template Manager is commanded to skip the next higher level of automated workflow template, and to instead select the second next higher workflow template. In this manner, an intermediate level of automation can be skipped if the change shifts are being tolerated well.

Deceleration of Workflow Progress

In a similar, but opposite, enhancement of the invention, a decelerated workflow progress can be implemented if the Maturity Manager detects that the maturity level has been reached more slowly than anticipated, such as the period of time following the most recent workflow complexity increase to which the performance benchmarks are again met and exceeds a time-to-recover threshold, then the Maturity Manager can implement a period of settling to allow the most recent changes to become more ingrained in the culture of the administrative staff before the next template is engaged.

For example, referring to FIG. 9, if the monitored error rate following a time of template change $t_{60}$ exceeds (92) a factor of the benchmark (94) for a period of $t_{61}$-$t_0$, then it is determined that the change was too disruptive. So, the time delay such as $t_3$ to $t_4$ or $t_6$ to $t_7$ to implement the next step in automation as shown in FIG. 4 may be extended to allow greater time for the staff to ingrain the most recent changes into the workflow culture.

Regression of Workflow Automation and Complexity

In another enhancement of the present invention, digression of the implementation of automation may be made by the invention when the Maturity Manager detects that the most recent increase in automation was not well tolerated. Referring again to FIG. 6, one indication of this, which is detected by the Maturity Manager, is the temporary excessive error count (62) following the engagement of a new workflow template not only exceeding the pre-defined benchmark, but also exceeding a multiple of the benchmark (94), where the multiple is greater than unity.

Another indication of this which is detected by the Maturity Manager is the period during which the error count (62) exceeds the standard benchmark (63) following the implementation of a change. If this period lasts for longer than a recovery time threshold $t_{62}$-$t_{60}$, then it is determined that the change was not well-tolerated. As a result of either, or both, situations being detected, the Maturity Manager commands the Template Manager to revert to the previously-engaged workflow template, thereby reducing the level of automation from the most recently attempted level to the previously used level.

If both thresholds are utilized in an embodiment, they form a recovery window (63) within which temporary error count increase is allowed, and outside of which error count increases result in a digression of automation level.

Suitable Computing Platform

Whereas at least one embodiment of the present invention incorporates, uses, or operates on, with, or through one or more computing platforms, and whereas many devices, even purpose-specific devices, are actually based upon computing platforms of one type or another, it is useful to describe a suitable computing platform, its characteristics, and its capabilities.

Therefore, it is useful to review a generalized architecture of a computing platform which may span the range of implementation, from a high-end web or enterprise server platform, to a personal computer, to a portable PDA or wireless phone.

In one embodiment of the invention, the functionality including the previously described logical processes are performed in part or wholly by software executed by a computer, such as personal computers, web servers, web browsers, or even an appropriately capable portable computing platform, such as personal digital assistant ("PDA"), web-enabled wireless telephone, or other type of personal information management ("PIM") device. In alternate embodiments, some or all of the functionality of the invention are realized in other logical forms, such as circuitry.

Figure 2A:
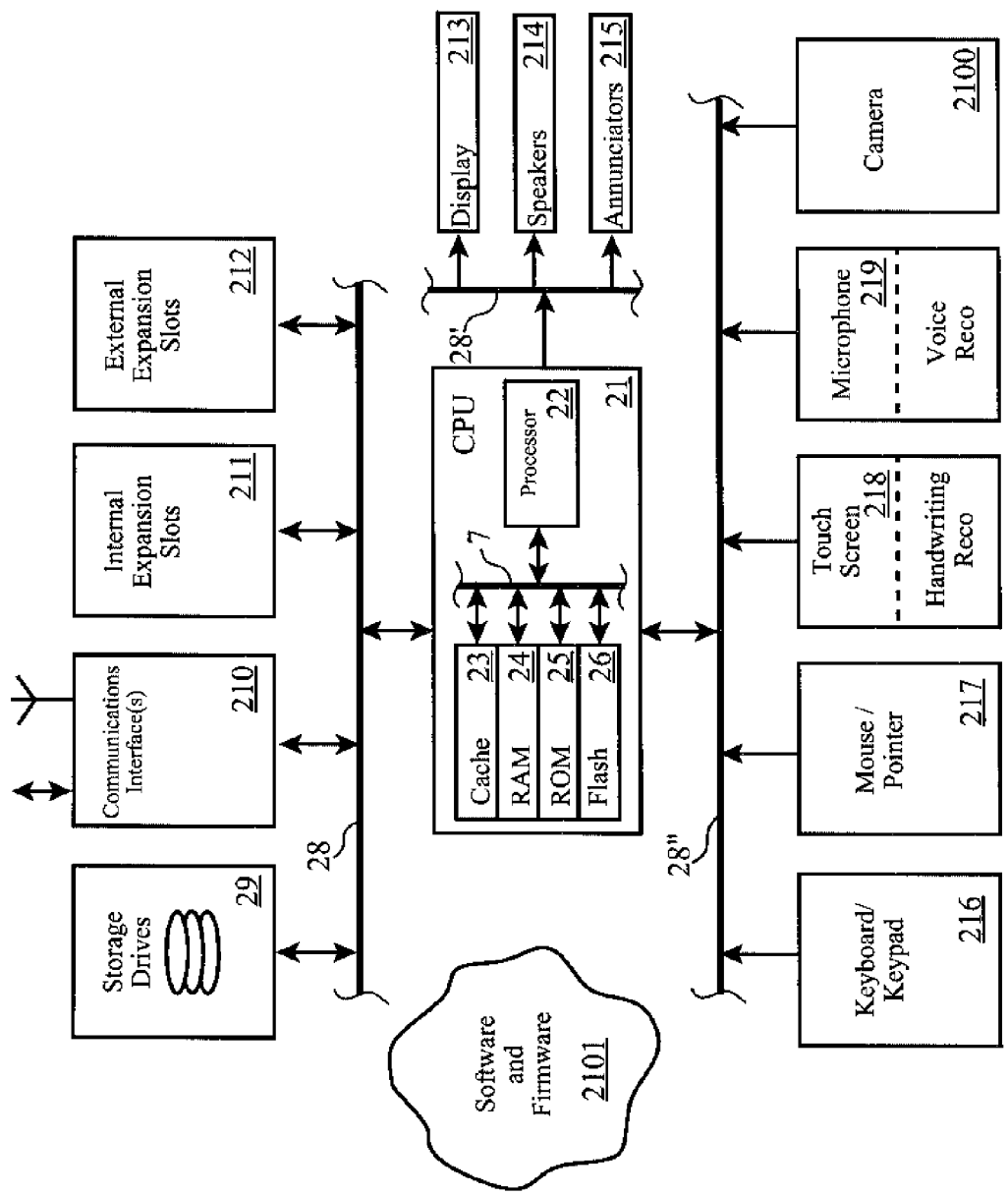
FIGS. 2a and 2b show a generalized computing platform architecture, and a generalized organization of software and firmware of such a computing platform architecture.

Turning to FIG. 2a, a generalized architecture is presented including a central processing unit (21) ("CPU"), which is typically comprised of a microprocessor (22) associated with random access memory ("RAM") (24) and read-only memory ("ROM") (25). Often, the CPU (21) is also provided with cache memory (23) and programmable FlashROM (26). The interface (27) between the microprocessor (22) and the various types of CPU memory is often referred to as a "local bus", but also may be a more generic or industry standard bus.

Many computing platforms are also provided with one or more storage drives (29), such as hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (210), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement ("IrDA") interface, too.

Computing platforms are often equipped with one or more internal expansion slots (211), such as Industry Standard Architecture ("ISA"), Enhanced Industry Standard Architecture ("EISA"), Peripheral Component Interconnect ("PCI"), or proprietary interface slots for the addition of other hardware, such as sound cards, memory boards, and graphics accelerators.

Additionally, many units, such as laptop computers and PDA's, are provided with one or more external expansion slots (212) allowing the user the ability to easily install and remove hardware expansion devices, such as PCMCIA cards, SmartMedia cards, and various proprietary modules such as removable hard drives, CD drives, and floppy drives.

Often, the storage drives (29), communication interfaces (210), internal expansion slots (211) and external expansion slots (212) are interconnected with the CPU (21) via a standard or industry open bus architecture (28), such as ISA, EISA, or PCI. In many cases, the bus (28) may be of a proprietary design.

A computing platform is usually provided with one or more user input devices, such as a keyboard or a keypad (216), and mouse or pointer device (217), and/or a touch-screen display (218). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (218) is usually provided, often with handwriting recognition capabilities.

Additionally, a microphone (219), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (2100), such as a still digital camera or full motion video digital camera.

One or more user output devices, such as a display (213), are also provided with most computing platforms. The display (213) may take many forms, including a Cathode Ray Tube ("CRT"), a Thin Flat Transistor ("TFT") array, or a simple set of light emitting diodes ("LED") or liquid crystal display ("LCD") indicators.

One or more speakers (214) and/or annunciators (215) are often associated with computing platforms, too. The speakers (214) may be used to reproduce audio 1 and music, such as the speaker of a wireless telephone or the speakers of a personal computer. Annunciators (215) may take the form of simple beep emitters or buzzers, commonly found on certain devices such as PDAs and PIMs.

These user input and output devices may be directly interconnected (28', 28") to the CPU (21) via a proprietary bus structure and/or interfaces, or they may be interconnected through one or more industry open buses such as ISA, EISA, PCI, etc. The computing platform is also provided with one or more software and firmware (2101) programs to implement the desired functionality of the computing platforms.

Figure 2B:
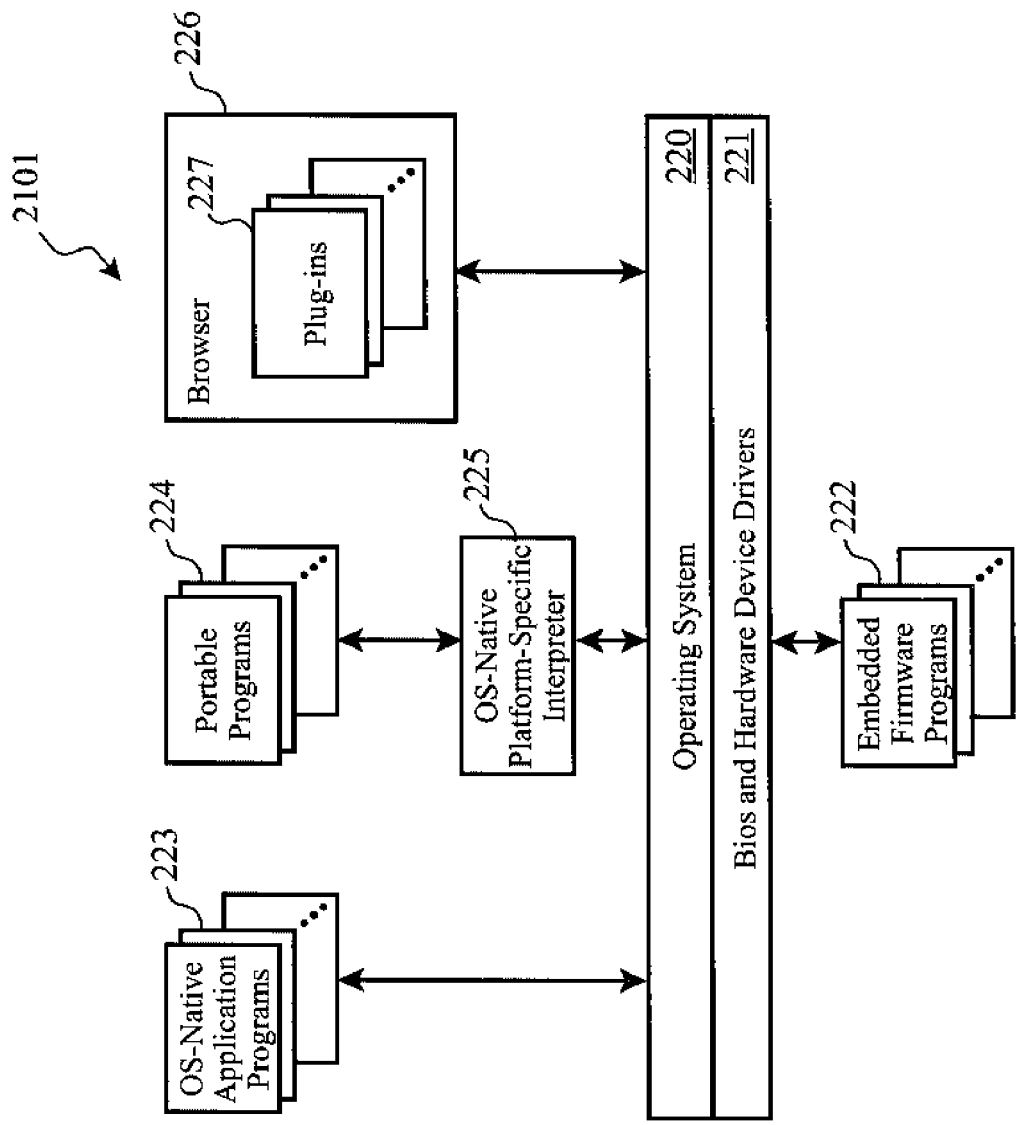

Turning to now FIG. 2b, more detail is given of a generalized organization of software and firmware (2101) on this range of computing platforms. One or more operating system ("OS") native application programs (223) may be provided on the computing platform, such as word processors, spreadsheets, contact management utilities, address book, calendar, email client, presentation, financial and bookkeeping programs.

Additionally, one or more "portable" or device-independent programs (224) may be provided, which must be interpreted by an OS-native platform-specific interpreter (225), such as Java™ scripts and programs.

Often, computing platforms are also provided with a form of web browser or micro-browser (226), which may also include one or more extensions to the browser such as browser plug-ins (227).

The computing device is often provided with an operating system (220), such as Microsoft Windows™, UNIX, IBM OS/2™, IBM AIX™, open source LINUX, Apple's MAC OS™, or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (221) are often provided to allow the operating system (220) and programs to interface to and control the specific hardware functions provided with the computing platform.

Additionally, one or more embedded firmware programs (222) are commonly provided with many computing platforms, which are executed by onboard or "embedded" microprocessors as part of the peripheral device, such as a micro controller or a hard drive, a communication processor, network interface card, or sound or graphics card.

As such, FIGS. 2a and 2b describe in a general sense the various hardware components, software and firmware programs of a wide variety of computing platforms, including but not limited to personal computers, PDAs, PIMs, web-enabled telephones, and other appliances such as WebTV™ units. As such, we now turn our attention to disclosure of the present invention relative to the processes and methods preferably implemented as software and firmware on such a computing platform. It will be readily recognized by those skilled in the art that the following methods and processes may be alternatively realized as hardware functions, in part or in whole, without departing from the spirit and scope of the invention.

Computer-Readable Media Embodiments

In another embodiment of the invention, logical processes according to the invention and described herein are encoded on or in one or more computer-readable media. Some computer-readable media are read-only (e.g. they must be initially programmed using a different device than that which is ultimately used to read the data from the media), some are write-only (e.g. from the data encoders perspective they can only be encoded, but not read simultaneously), or read-write. Still some other media are write-once, read-many-times.

Some media are relatively fixed in their mounting mechanisms, while others are removable, or even transmittable. All computer-readable media form two types of systems when encoded with data and/or computer software: (a) when removed from a drive or reading mechanism, they are memory devices which generate useful data-driven outputs when stimulated with appropriate electromagnetic, electronic, and/or optical signals; and (b) when installed in a drive or reading device, they form a data repository system accessible by a computer.

Figure 4A:
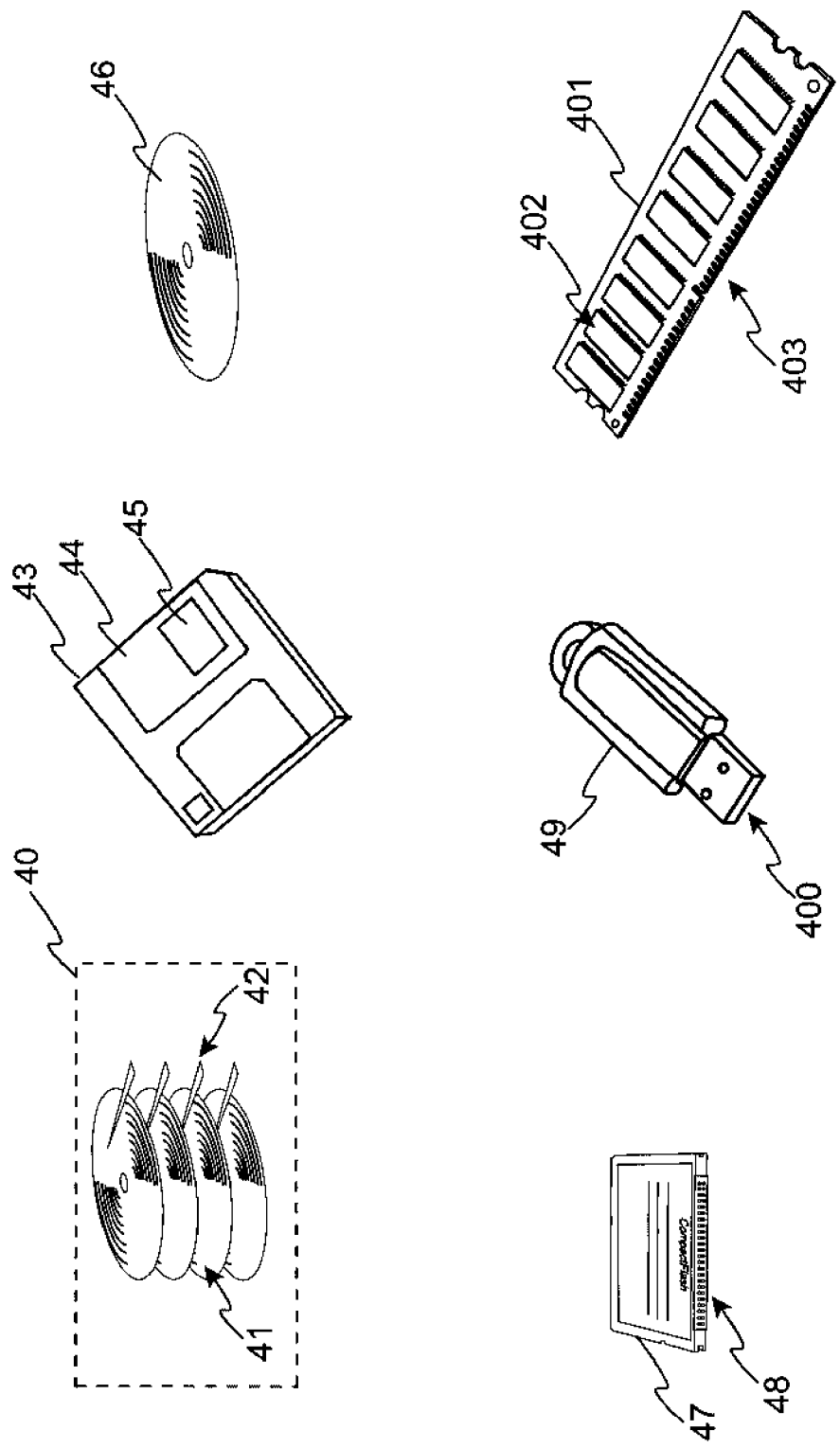

FIG. 4a illustrates some computer readable media including a computer hard drive (40) having one or more magnetically encoded platters or disks (41), which may be read, written, or both, by one or more heads (42). Such hard drives are typically semi-permanently mounted into a complete drive unit, which may then be integrated into a configurable computer system such as a Personal Computer, Server Computer, or the like.

Similarly, another form of computer readable media is a flexible, removable "floppy disk" (43), which is inserted into a drive which houses an access head. The floppy disk typically includes a flexible, magnetically encodable disk which is accessible by the drive head through a window (45) in a sliding cover (44).

A Compact Disk ("CD") (46) is usually a plastic disk which is encoded using an optical and/or magneto-optical process, and then is read using generally an optical process. Some CD's are read-only ("CD-ROM"), and are mass produced prior to distribution and use by reading-types of drives. Other CD's are writable (e.g. "CD-RW", "CD-R"), either once or many time. Digital Versatile Disks ("DVD") are advanced versions of CD's which often include double-sided encoding of data, and even multiple layer encoding of data. Like a floppy disk, a CD or DVD is a removable media.

Another common type of removable media are several types of removable circuit-based (e.g. solid state) memory devices, such as Compact Flash ("CF")(47), Secure Data ("SD"), Sony's MemoryStick, Universal Serial Bus ("USB") FlashDrives and "Thumbdrives" (49), and others. These devices are typically plastic housings which incorporate a digital memory chip, such as a battery-backed random access chip ("RAM"), or a Flash Read-Only Memory ("FlashROM"). Available to the external portion of the media is one or more electronic connectors (48, 400) for engaging a connector, such as a CF drive slot or a USB slot. Devices such as a USB FlashDrive are accessed using a serial data methodology, where other devices such as the CF are accessed using a parallel methodology. These devices often offer faster access times than disk-based media, as well as increased reliability and decreased susceptibility to mechanical shock and vibration. Often, they provide less storage capability than comparably priced disk-based media.

Yet another type of computer readable media device is a memory module (403), often referred to as a SIMM or DIMM. Similar to the CF, SD, and FlashDrives, these modules incorporate one or more memory devices (402), such as Dynamic RAM ("DRAM"), mounted on a circuit board (401) having one or more electronic connectors for engaging and interfacing to another circuit, such as a Personal Computer motherboard. These types of memory modules are not usually encased in an outer housing, as they are intended for installation by trained technicians, and are generally protected by a larger outer housing such as a Personal Computer chassis.

Figure 4B:
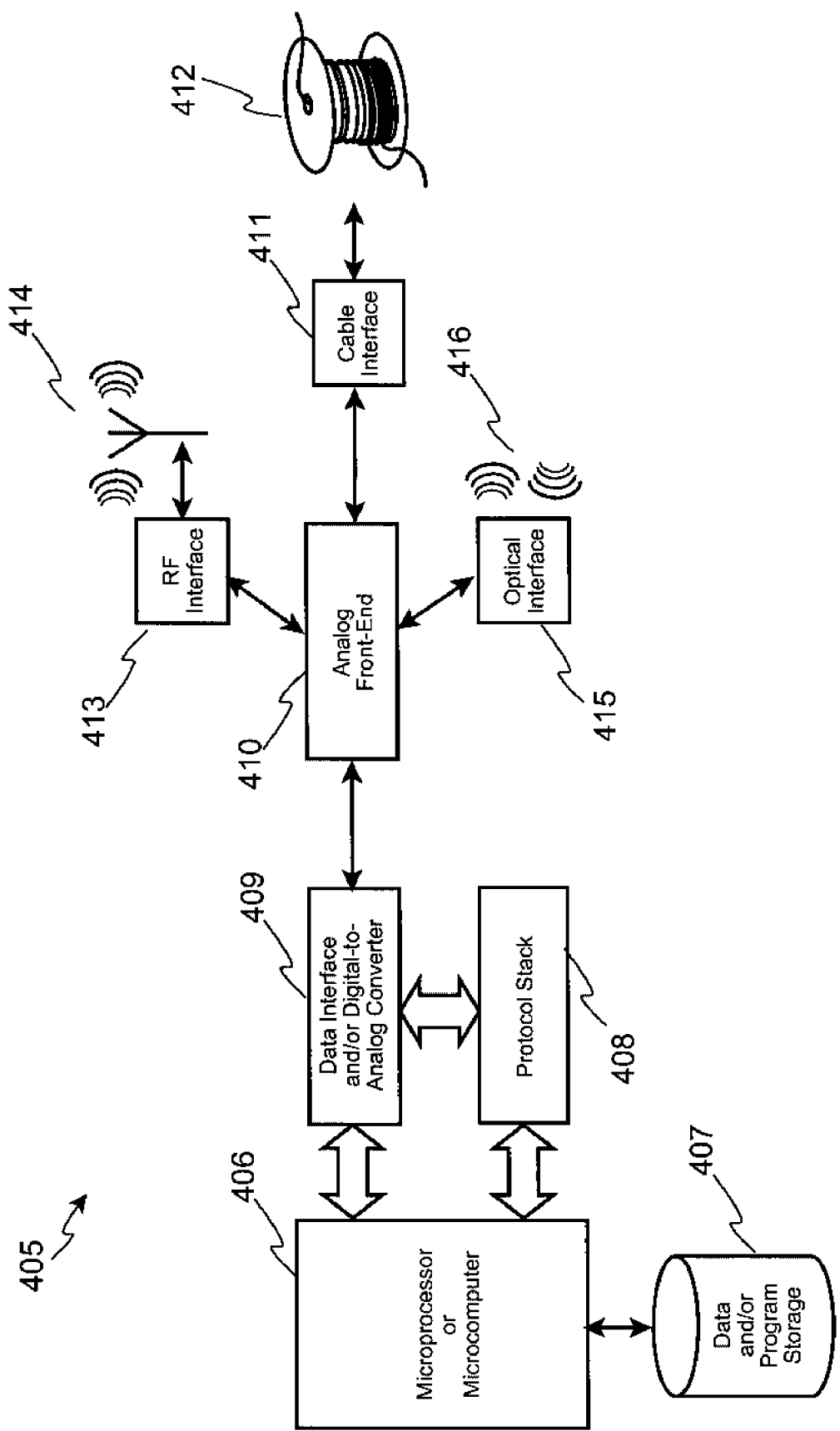

Turning now to FIG. 4b, another embodiment option (405) of the present invention is shown in which a computer-readable signal is encoded with software, data, or both, which implement logical processes according to the invention. FIG. 4b is generalized to represent the functionality of wireless, wired, electro-optical, and optical signaling systems. For example, the system shown in FIG. 4b can be realized in a manner suitable for wireless transmission over Radio Frequencies ("RF"), as well as over optical signals, such as InfraRed Data Arrangement ("IrDA"). The system of FIG. 4b may also be realized in another manner to serve as a data transmitter, data receiver, or data transceiver for a USB system, such as a drive to read the aforementioned USB FlashDrive, or to access the serially-stored data on a disk, such as a CD or hard drive platter.

In general, a microprocessor or microcontroller (406) reads, writes, or both, data to/from storage for data, program, or both (407). A data interface (409), optionally including a digital-to-analog converter, cooperates with an optional protocol stack (408), to send, receive, or transceive data between the system front-end (410) and the microprocessor (406). The protocol stack is adapted to the signal type being sent, received, or transceived. For example, in a Local Area Network ("LAN") embodiment, the protocol stack may implement Transmission Control Protocol/Internet Protocol ("TCP/IP"). In a computer-to-computer or computer-to-peripheral embodiment, the protocol stack may implement all or portions of USB, "FireWire", RS-232, Point-to-Point Protocol ("PPP"), etc.

The system's front-end, or analog front-end, is adapted to the signal type being modulated, demodulate, or transcoded. For example, in an RF-based (413) system, the analog front-end comprises various local oscillators, modulators, demodulators, etc., which implement signaling formats such as Frequency Modulation ("FM"), Amplitude Modulation ("AM"), Phase Modulation ("PM"), Pulse Code Modulation ("PCM"), etc. Such an RF-based embodiment typically includes an antenna (414) for transmitting, receiving, or transceiving electro-magnetic signals via open air, water, earth, or via RF wave guides and coaxial cable. Some common open air transmission standards are BlueTooth, Global Services for Mobile Communications ("GSM"), Time Division Multiple Access ("TDMA"), Advanced Mobile Phone Service ("AMPS"), and Wireless Fidelity ("Wi-Fi").

In another example embodiment, the analog front-end may be adapted to sending, receiving, or transceiving signals via an optical interface (415), such as laser-based optical interfaces (e.g. Wavelength Division Multiplexed, SONET, etc.), or Infra Red Data Arrangement ("IrDA") interfaces (416). Similarly, the analog front-end may be adapted to sending, receiving, or transceiving signals via cable (412) using a cable interface, which also includes embodiments such as USB, Ethernet, LAN, twisted-pair, coax, Plain-old Telephone Service ("POTS"), etc.

Signals transmitted, received, or transceived, as well as data encoded on disks or in memory devices, may be encoded to protect it from unauthorized decoding and use. Other types of encoding may be employed to allow for error detection, and in some cases, correction, such as by addition of parity bits or Cyclic Redundancy Codes ("CRC"). Still other types of encoding may be employed to allow directing or "routing" of data to the correct destination, such as packet and frame-based protocols.

FIG. 4c illustrates conversion systems which convert parallel data to and from serial data. Parallel data is most often directly usable by microprocessors, often formatted in 8-bit wide bytes, 16-bit wide words, 32-bit wide double words, etc. Parallel data can represent executable or interpretable software, or it may represent data values, for use by a computer. Data is often serialized in order to transmit it over a media, such as a RF or optical channel, or to record it onto a media, such as a disk. As such, many computer-readable media systems include circuits, software, or both, to perform data serialization and re-parallelization.

Parallel data (421) can be represented as the flow of data signals aligned in time, such that parallel data unit (byte, word, d-word, etc.) (422, 423, 424) is transmitted with each bit $D_0$-$D_n$, being on a bus or signal carrier simultaneously, where the "width" of the data unit is n−1. In some systems, $D_0$ is used to represent the least significant bit ("LSB"), and in other systems, it represents the most significant bit ("MSB"). Data is serialized (421) by sending one bit at a time, such that each data unit (422, 423, 424) is sent in serial fashion, one after another, typically according to a protocol.

As such, the parallel data stored in computer memory (407, 407') is often accessed by a microprocessor or Parallel-to-Serial Converter (425, 425') via a parallel bus (421), and exchanged (e.g. transmitted, received, or transceived) via a serial bus (421'). Received serial data is converted back into parallel data before storing it in computer memory, usually. The serial bus (421') generalized in FIG. 4c may be a wired bus, such as USB or Firewire, or a wireless communications medium, such as an RF or optical channel, as previously discussed.

In these manners, various embodiments of the invention may be realized by encoding software, data, or both, according to the logical processes of the invention, into one or more computer-readable mediums, thereby yielding a product of manufacture and a system which, when properly read, received, or decoded, yields useful programming instructions, data, or both, including, but not limited to, the computer-readable media types described in the foregoing paragraphs.

Service-Based Embodiments

Alternative embodiments of the present invention include some or all of the foregoing logical processes and functions of the invention being provided by configuring software, deploying software, downloading software, distributing software, or remotely serving clients in an on demand environment.

Software Deployment Embodiment. According to one embodiment of the invention, the methods and processes of the invention are distributed or deployed as a service by a service provider to a client's computing system(s). For example, a supplier of a workflow automation system to a corporate client using the workflow automation system may contract to design, distribute, and install the workflow templates on a fee-for-service basis, rather than selling or leasing the invention directly to the corporate client.

Figure 3A:
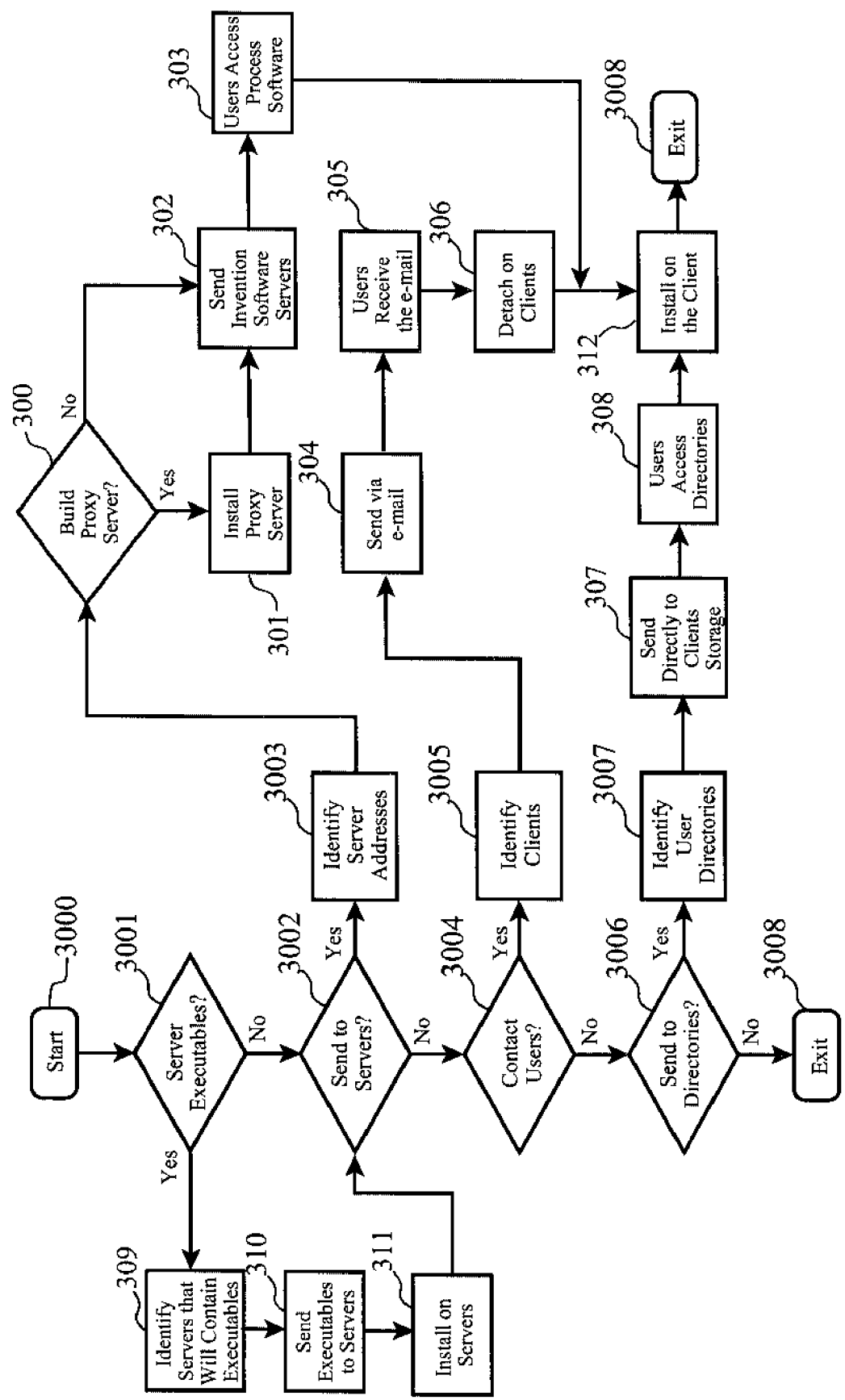
FIG. 3a sets forth a logical process to deploy software to a client in which the deployed software embodies the methods and processes of the present and related inventions.

Turning to FIG. 3a, the deployment process begins (3000) by determining (3001) if there are any programs that will reside on a server or servers when the process software is executed. If this is the case, then the servers that will contain the executables are identified (309). The process software for the server or servers is transferred directly to the servers storage via FTP or some other protocol or by copying through the use of a shared files system (310). The process software is then installed on the servers (311).

Next a determination is made on whether the process software is to be deployed by having users access the process software on a server or servers (3002). If the users are to access the process software on servers, then the server addresses that will store the process software are identified (3003).

In step (3004) a determination is made whether the process software is to be developed by sending the process software to users via e-mail. The set of users where the process software will be deployed are identified together with the addresses of the user client computers (3005). The process software is sent via e-mail to each of the user's client computers. The users then receive the e-mail (305) and then detach the process software from the e-mail to a directory on their client computers (306). The user executes the program that installs the process software on his client computer (312) then exits the process (3008).

A determination is made if a proxy server is to be built (300) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed (301). The process software is sent to the servers either via a protocol such as FTP or it is copied directly from the source files to the server files via file sharing (302). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (303). Another embodiment is to have the servers automatically copy the process software to each client and then run the installation program for the process software at each client computer. The user executes the program that installs the process software on his client computer (312) then exits the process (3008).

Lastly, a determination is made on whether the process software will be sent directly to user directories on their client computers (3006). If so, the user directories are identified (3007). The process software is transferred directly to the user's client computer directory (307). This can be done in several ways such as, but not limited to, sharing of the file system directories and then copying from the sender's file system to the recipient user's file system or alternatively using a transfer protocol such as File Transfer Protocol ("FTP"). The users access the directories on their client file systems in preparation for installing the process software (308). The user executes the program that installs the process software on his client computer (312) then exits the process (3008).

Software Integration Embodiment. According to another embodiment of the present invention, software embodying the methods and processes disclosed herein are integrated as a service by a service provider to other software applications, applets, or computing systems.

Integration of the invention generally includes providing for the process software to coexist with applications, operating systems and network operating systems software and then installing the process software on the clients and servers in the environment where the process software will function.

Generally speaking, the first task is to identify any software on the clients and servers including the network operating system where the process software will be deployed that are required by the process software or that work in conjunction with the process software. This includes the network operating system that is software that enhances a basic operating system by adding networking features. Next, the software applications and version numbers will be identified and compared to the list of software applications and version numbers that have been tested to work with the process software. Those software applications that are missing or that do not match the correct version will be upgraded with the correct version numbers Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 3B:
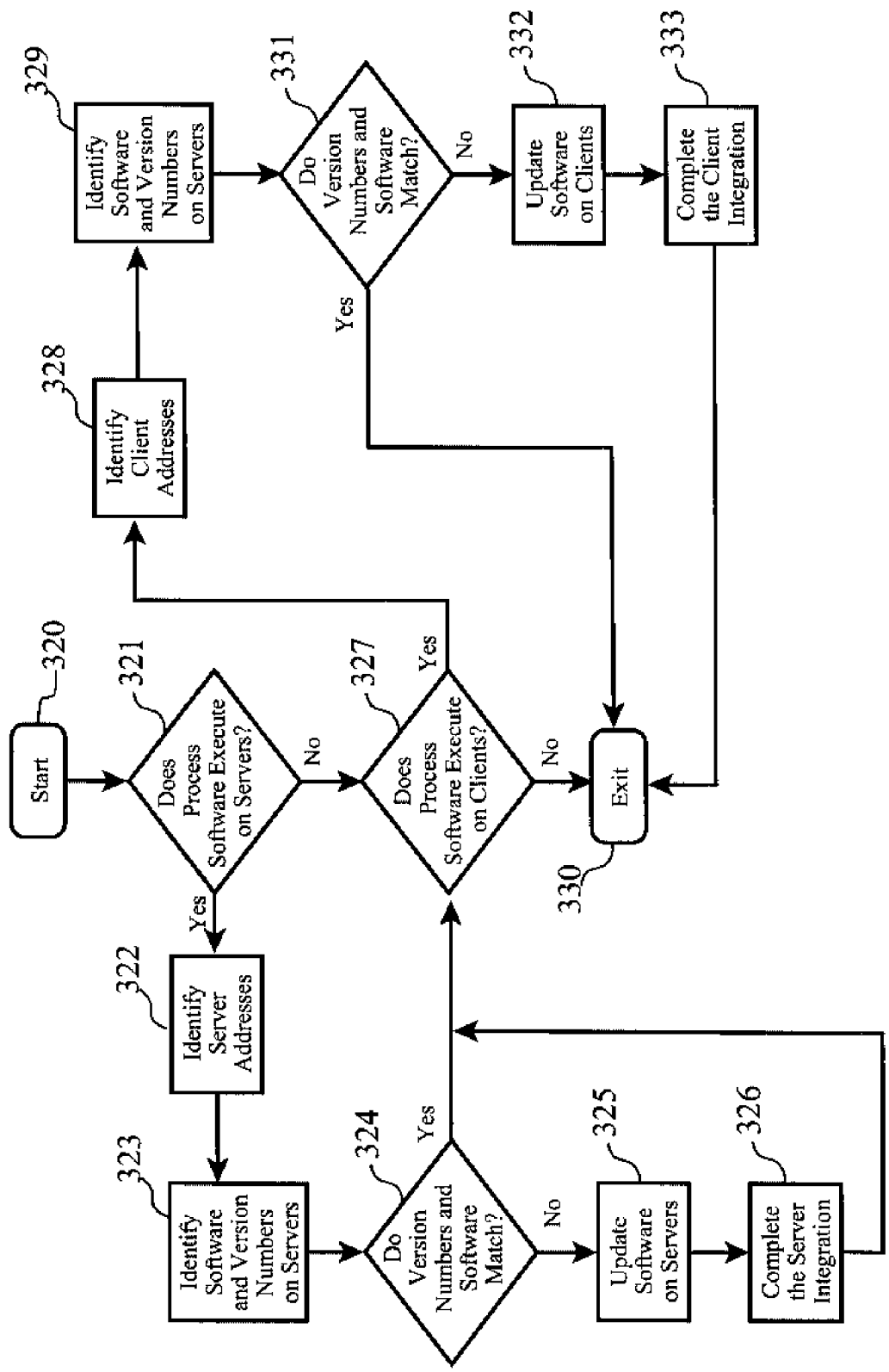
FIG. 3b sets forth a logical process to integrate software to other software programs in which the integrated software embodies the methods and processes of the present and related inventions.

Turning to FIG. 3b, details of the integration process according to the invention are shown. Integrating begins (320) by determining if there are any process software programs that will execute on a server or servers (321). If this is not the case, then integration proceeds to (327). If this is the case, then the server addresses are identified (322). The servers are checked to see if they contain software that includes the operating system ("OS"), applications, and network operating systems ("NOS"), together with their version numbers, that have been tested with the process software (323). The servers are also checked to determine if there is any missing software that is required by the process software (323).

A determination is made if the version numbers match the version numbers of OS, applications and NOS that have been tested with the process software (324). If all of the versions match, then processing continues (327). Otherwise, if one or more of the version numbers do not match, then the unmatched versions are updated on the server or servers with the correct versions (325). Additionally, if there is missing required software, then it is updated on the server or servers (325). The server integration is completed by installing the process software (326).

Step (327) which follows either (321), (324), or (326) determines if there are any programs of the process software that will execute on the clients. If no process software programs execute on the clients, the integration proceeds to (330) and exits. If this is not the case, then the client addresses are identified (328).

The clients are checked to see if they contain software that includes the operating system ("OS"), applications, and network operating systems ("NOS"), together with their version numbers, that have been tested with the process software (329). The clients are also checked to determine if there is any missing software that is required by the process software (329).

A determination is made if the version numbers match the version numbers of OS, applications and NOS that have been tested with the process software 331. If all of the versions match and there is no missing required software, then the integration proceeds to (330) and exits.

If one or more of the version numbers do not match, then the umatched versions are updated on the clients with the correct versions (332). In addition, if there is missing required software then it is updated on the clients (332). The client integration is completed by installing the process software on the clients (333). The integration proceeds to (330) and exits.

Application Programming Interface Embodiment. In another embodiment, the invention may be realized as a service or functionality available to other systems and devices via an Application Programming Interface ("API"). One such embodiment is to provide the service to a client system from a server system as a web service.

On-Demand Computing Services Embodiment. According to another aspect of the present invention, the processes and methods disclosed herein are provided through an on demand computing architecture to render service to a client by a service provider.

Figure 3C:
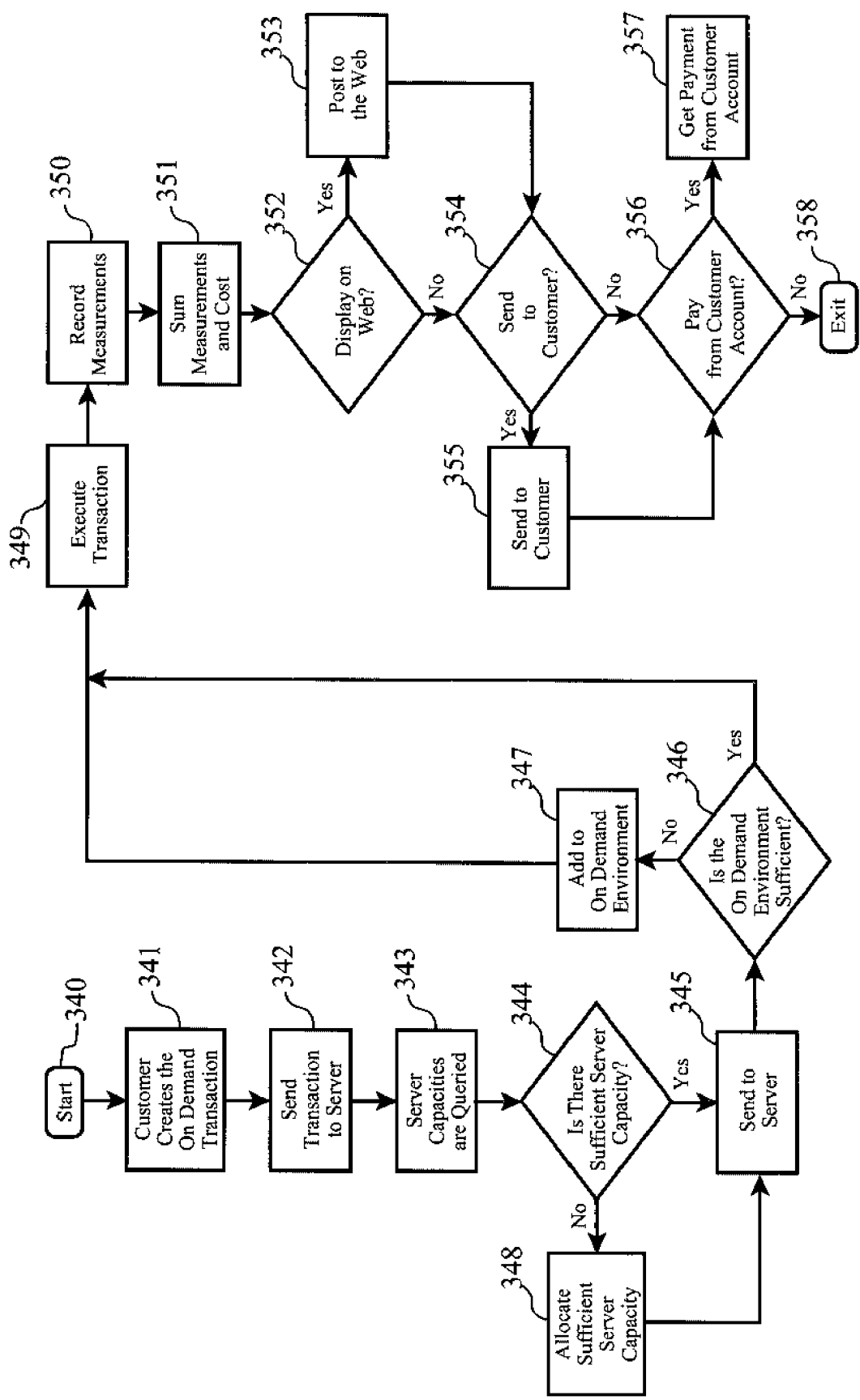
FIG. 3c sets forth a logical process to execute software on behalf of a client in an on-demand computing system, in which the executed software embodies the methods and processes of the present and related inventions.

Turning to FIG. 3c, generally speaking, the process software embodying the methods disclosed herein is shared, simultaneously serving multiple customers in a flexible, automated fashion. It is standardized, requiring little customization and it is scaleable, providing capacity on demand in a pay-as-you-go model.

The process software can be stored on a shared file system accessible from one or more servers. The process software is executed via transactions that contain data and server processing requests that use CPU units on the accessed server.

CPU units are units of time such as minutes, seconds, hours on the central processor of the server. Additionally, the assessed server may make requests of other servers that require CPU units. CPU units are an example that represents but one measurement of use. Other measurements of use include but are not limited to network bandwidth, memory usage, storage usage, packet transfers, complete transactions, etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to effect the performance of that server, other servers are accessed to increase the capacity and to share the workload. Likewise, when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the computer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

FIG. 3c sets forth a detailed logical process which makes the present invention available to a client through an On-Demand process. A transaction is created that contains the unique customer identification, the requested service type and any service parameters that further specify the type of service (341). The transaction is then sent to the main server (342). In an On-Demand environment the main server can initially be the only server, then as capacity is consumed other servers are added to the On-Demand environment.

The server central processing unit ("CPU") capacities in the On-Demand environment are queried (343). The CPU requirement of the transaction is estimated, then the servers available CPU capacity in the On-Demand environment are compared to the transaction CPU requirement to see if there is sufficient CPU available capacity in any server to process the transaction (344). If there is not sufficient server CPU available capacity, then additional server CPU capacity is allocated to process the transaction (348). If there was already sufficient available CPU capacity, then the transaction is sent to a selected server (345).

Before executing the transaction, a check is made of the remaining On-Demand environment to determine if the environment has sufficient available capacity for processing the transaction. This environment capacity consists of such things as, but not limited to, network bandwidth, processor memory, storage etc. (345). If there is not sufficient available capacity, then capacity will be added to the On-Demand environment (347). Next, the required software to process the transaction is accessed, loaded into memory, then the transaction is executed (349).

The usage measurements are recorded (350). The usage measurements consists of the portions of those functions in the On-Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (351).

If the customer has requested that the On-Demand costs be posted to a web site (352), then they are posted (353). If the customer has requested that the On-Demand costs be sent via e-mail to a customer address (354), then they are sent (355). If the customer has requested that the On-Demand costs be paid directly from a customer account (356), then payment is received directly from the customer account (357). The last step is to exit the On-Demand process.

Grid or Parallel Processing Embodiment. According to another embodiment of the present invention, multiple computers are used to simultaneously process individual audio tracks, individual audio snippets, or a combination of both, to yield output with less delay. Such a parallel computing approach may be realized using multiple discrete systems (e.g. a plurality of servers, clients, or both), or may be realized as an internal multiprocessing task (e.g. a single system with parallel processing capabilities).

VPN Deployment Embodiment. According to another aspect of the present invention, the methods and processes described herein may be embodied in part or in entirety in software which can be deployed to third parties as part of a service, wherein a third party VPN service is offered as a secure deployment vehicle or wherein a VPN is build on-demand as required for a specific deployment.

A virtual private network ("VPN") is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider ("ESP") sets a network access server ("NAS") and provides the remote users with desktop client software for their computers. The telecommuters can then dial a toll-free number to attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over the network. The protocol of the outer packet is understood by the network and both points, called tunnel interfaces, where the packet enters and exits the network.

Figure 3D:
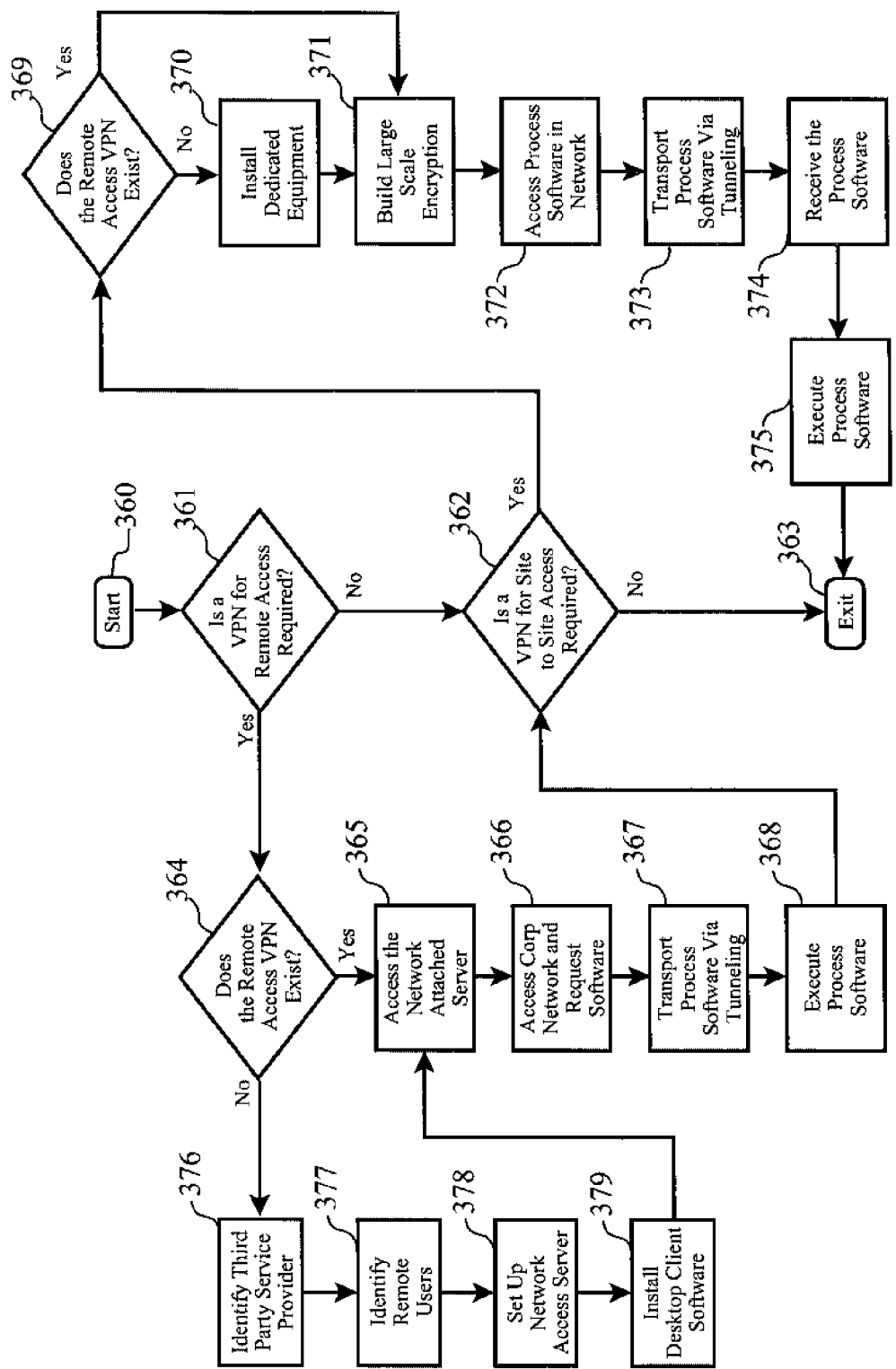
FIG. 3d sets forth a logical process to deploy software to a client via a virtual private network, in which the deployed software embodies the methods and processes of the present and related inventions.

Turning to FIG. 3d, VPN deployment process starts (360) by determining if a VPN for remote access is required (361). If it is not required, then proceed to (362). If it is required, then determine if the remote access VPN exits (364).

If a VPN does exist, then the VPN deployment process proceeds (365) to identify a third party provider that will provide the secure, encrypted connections between the company's private network and the company's remote users (376). The company's remote users are identified (377). The third party provider then sets up a network access server ("NAS") (378) that allows the remote users to dial a toll free number or attach directly via a broadband modem to access, download and install the desktop client software for the remote-access VPN (379).

After the remote access VPN has been built or if it has been previously installed, the remote users can access the process software by dialing into the NAS or attaching directly via a cable or DSL modem into the NAS (365). This allows entry into the corporate network where the process software is accessed (366). The process software is transported to the remote user's desktop over the network via tunneling. That is the process software is divided into packets and each packet including the data and protocol is placed within another packet (367). When the process software arrives at the remote user's desktop, it is removed from the packets, reconstituted and then is executed on the remote users desktop (368).

A determination is made to see if a VPN for site to site access is required (362). If it is not required, then proceed to exit the process (363). Otherwise, determine if the site to site VPN exists (369). If it does exist, then proceed to (372). Otherwise, install the dedicated equipment required to establish a site to site VPN (370). Then, build the large scale encryption into the VPN (371).

After the site to site VPN has been built or if it had been previously established, the users access the process software via the VPN (372). The process software is transported to the site users over the network via tunneling. That is the process software is divided into packets and each packet including the data and protocol is placed within another packet (374). When the process software arrives at the remote user's desktop, it is removed from the packets, reconstituted and is executed on the site users desktop (375). Proceed to exit the process (363).

Conclusion

While certain examples and details of various embodiments have been disclosed, it will be recognized by those skilled in the art that variations in implementation such as use of different programming methodologies, computing platforms, and processing technologies, may be adopted without departing from the spirit and scope of the present invention. Therefore, the scope of the invention should be determined by the following claims.

What is claimed is:

1. An automated method for gradually automating a workflow comprising:

providing to a configuration management system a first through $N^{th}$ plurality of workflow templates, the templates comprising a first workflow template having a first level of automation and complexity in which at least a plurality of tasks require manual input, manual response, or manual approval, wherein the first through $N^{th}$ templates having progressively greater automation than the lower-ordered templates, wherein N is two or greater, wherein greater automation comprises fewer tasks which require manual input or interaction with a user, and wherein the configuration management system comprises a computing platform including a processor;

subsequent to the providing of the plurality of progressively greater automation workflow templates, operating the first workflow template by the configuration management system;

during or subsequent to the operating of the first workflow template, determining by the configuration management system a maturity level measurement of errors for one or more user interactions selected from the group consisting of manual input, manual response, or manual approval;

responsive to detecting by the configuration management system that the maturity level measurement conforms to a pre-determined benchmark, automatically selecting, engaging, and operating by the configuration management system the second workflow template, thereby increasing automation by one or more workflow changes selected from the group consisting of automating one or more subprocesses, adding one or more subprocesses, or eliminating one or more subprocesses; and repeating the determining of maturity level, and conditionally selecting, engaging, and operating to select progressively greater automation through the $N^{th}$ workflow template by the configuration management system, thereby continuing to increase automation by one or more workflow changes selected from the group consisting of automating one or more subprocesses, adding one or more subprocesses, or eliminating one or more subprocesses, the increases in automation being automatic responses by the configuration management system to the maturity level conforming to the pre-determined benchmark.

2. The method as set forth in claim 1 wherein the determining a maturity level measurement further comprises monitoring an operator satisfaction rate.

3. The method as set forth in claim 1 further comprising delaying a next level of increased automation responsive to determination of the operator error rate being exceeded for a specific period of time following engaging a workflow template, thereby causing a time delay to automatic engagement of a higher ordered workflow template having greater automation.

4. The method as set forth in claim 1 further comprising accelerating a pace of workflow automation by, responsive to determination of the operator error rate being met within a specific period of time following a step of engaging a subsequent workflow template, selecting and engaging a higher ordered workflow template subsequent to a next workflow template in said plurality of workflow templates.

5. The method as set forth in claim 1 further comprising regressing workflow automation by, responsive to determination of said operator error rate exceeding a multiple of the benchmark following the step of engaging a workflow template, selecting and engaging a lower ordered workflow template in the plurality of workflow templates.

6. The method as set forth in claim 1 further comprising regressing workflow automation by, responsive to determination of said operator error rate exceeding the benchmark for a predetermined period following the engaging of a higher ordered workflow template, selecting and engaging a lower ordered workflow template in the plurality of workflow templates.

7. The method as set forth in claim 1 wherein the responding to detection of the maturity level measurement conforming to a pre-determined benchmark further comprises:
   automatically notifying by the configuration management system to a process administrator that the benchmark has been met, and proposing a higher ordered workflow template which increases automation by automating one or more subprocesses, adding one or more subprocesses, or eliminating one or more subprocesses;
   receiving by the configuration management system from the administrator a selection of a higher ordered workflow template; and
   engaging and operating by the configuration management system the administrator-selected workflow template.

8. A computer program product comprising:
   a tangible, computer readable storage memory device; and
   one or more computer programs encoded by the tangible, computer readable storage memory device, the computer program being configured to cause a processor to perform the steps of:
   providing to a configuration management system a first through $N^{th}$ plurality of workflow templates, the templates comprising a first workflow template having a first level of automation and complexity in which at least a plurality of tasks require manual input, manual response, or manual approval, the first through $N^{th}$ templates having progressively greater automation than the lower-ordered templates, wherein N is two or greater, wherein greater automation comprises fewer tasks which require manual input or interaction with a user, and wherein the configuration management system comprises a computing platform including a processor;
   subsequent to the providing of the plurality of progressively greater automation workflow templates, operating the first workflow template by the configuration management system;
   during or subsequent to the operating of the first workflow template, determining by the configuration management system a maturity level measurement of errors for one or more user interactions selected from the group consisting of manual input, manual response, or manual approval;
   responsive to detecting by the configuration management system that the maturity level measurement conforms to a pre-determined benchmark, automatically selecting, engaging, and operating by the configuration management system the second workflow template, thereby increasing automation by one or more workflow changes selected from the group consisting of automating one or more subprocesses, adding one or more subprocesses, or eliminating one or more subprocesses; and
   repeating the determining of maturity level, and conditionally selecting, engaging, and operating to select progressively greater automation through the $N^{th}$ workflow template by the configuration management system, thereby continuing to increase automation by one or more workflow changes selected from the group consisting of automating one or more subprocesses, adding one or more subprocesses, or eliminating one or more subprocesses, the increases in automation being automatic responses by the configuration management system to the maturity level conforming to the pre-determined benchmark.

9. The computer program product as set forth in claim 8 wherein the computer program is further configured to cause a processor to determine a maturity level measurement by surveying one or more operator users.

10. The computer program product as set forth in claim 8 wherein the computer program for responding to detection of the maturity level measurement conforming to a pre-determined benchmark further comprises computer program configured to cause a processor to:
    automatically notify a process administrator that the benchmark has been met, and to propose a higher ordered workflow template which increases automation by automating one or more subprocesses, adding one or more subprocesses, or eliminating one or more subprocesses;
    receive from the administrator a selection of a higher ordered workflow template; and
    engage and operate the selected higher ordered workflow template by the configuration management system.

11. A system comprising:
    a first through $N^{th}$ plurality of workflow templates provided into a tangible, computer readable storage memory device, the templates comprising a first workflow template having a first level of automation and complexity in which at least a plurality of tasks require manual input, manual response, or manual approval, the first through $N^{th}$ templates having progressively greater automation than the lower ordered templates, wherein N is two or greater, wherein greater automation comprises fewer tasks which require manual input or interaction with a user;
    a configuration management system having a processor and having access to the plurality of workflow templates in the memory device, the configuration management system configured to operate a workflow template selected from the provided plurality of workflow templates;
    a maturity manager portion of the configuration management system configured to, subsequent to the providing of the plurality of progressively greater automation workflow templates, and during or subsequent to the operating of the first workflow template determine a maturity level measurement of errors for one or more user interactions selected from the group consisting of manual input, manual response, or manual approval;
    a template manager portion of the configuration management system configured to:
    responsive to detecting by the configuration management system that the maturity level measurement conforms to a pre-determined benchmark, automatically select, engage, and operate by the configuration management system the second workflow template, thereby increasing automation by one or more workflow changes selected from the group consisting of automating one or more subprocesses, adding one or more subprocesses, or eliminating one or more subprocesses; and
    repeat the determining of maturity level, and conditionally selecting, engaging, and operating to select progressively greater automation through the $N^{th}$ workflow templates by the configuration management system, thereby continuing to increase automation by one or more workflow changes selected from the group consisting of automating one or more subprocesses, adding one or more subprocesses, or eliminating one or more subprocesses, the increases in automation being automatic responses by the configuration management system to the maturity level conforming to the pre-determined benchmark.

12. The system as set forth in claim 11 wherein the maturity level measurement comprises a survey of operator users during operation of a currently selected workflow template.

13. The system as set forth in claim 11 wherein the template manager portion is further configured to respond to detection of the maturity level measurement conforming to a pre-determined benchmark by automatically notifying a process administrator that the benchmark has been met; proposing a higher order workflow template which increases automation by automating one or more subprocesses, adding one or more subprocesses, or eliminating one or more subprocesses; receiving from the administrator a selection of a higher order workflow template; and engaging and operating the selected higher order workflow template by the configuration management system.

* * * * *